United States Patent [19]

Kopec et al.

[11] Patent Number: 5,526,444
[45] Date of Patent: Jun. 11, 1996

[54] DOCUMENT IMAGE DECODING USING MODIFIED BRANCH-AND-BOUND METHODS

[75] Inventors: Gary E. Kopec, Belmont, Calif.;
Anthony C. Kam, Cambridge, Mass.;
Philip A. Chou, Menlo Park, Calif.

[73] Assignee: Xerox Corporation, Stamford, Conn.

[21] Appl. No.: 60,196

[22] Filed: May 7, 1993

Related U.S. Application Data

[63] Continuation-in-part of Ser. No. 805,700, Dec. 10, 1991, Pat. No. 5,321,773.

[51] Int. Cl.⁶ .................................................. G06K 9/36
[52] U.S. Cl. ........................ 382/233; 382/228; 382/229; 382/209
[58] Field of Search ................................ 382/3, 13, 14, 382/15, 39, 56, 40, 232, 233, 228, 243, 229, 209; 381/41, 42, 43

[56] References Cited

U.S. PATENT DOCUMENTS

| | | | |
|---|---|---|---|
| 4,593,367 | 6/1986 | Slack et al. | 382/15 |
| 4,599,692 | 7/1986 | Tan et al. | 382/15 |
| 5,199,077 | 3/1993 | Wilcox et al. | 381/43 |
| 5,228,076 | 7/1993 | Hopner et al. | 379/96 |
| 5,321,725 | 6/1994 | Paik et al. | 348/384 |
| 5,321,773 | 6/1994 | Kopec et al. | 382/36 |

FOREIGN PATENT DOCUMENTS

| | | | |
|---|---|---|---|
| 0515709 | 12/1992 | European Pat. Off. | G10L 5/04 |
| 0546843 | 6/1993 | European Pat. Off. | G06K 9/00 |

*Primary Examiner*—Leo Boudreau
*Assistant Examiner*—David R. Anderson
*Attorney, Agent, or Firm*—Rosen, Dainow & Jacobs

[57] ABSTRACT

An image decoding and recognition system and method comprising a fast heuristic algorithm using hidden Markov models (HMM). The new search algorithm, called an "iterative complete path" (ICP) algorithm, patterned after well-known branch-and-bound (B&B) methods, significantly reduces the complexity and improves the speed of HMM image decoding without sacrificing the optimality of the straightforward procedure. An advantageous form of the heuristic functions which is useful in applying the ICP algorithm to text-like images is described. The ICP algorithm is directly applicable to the separable type of finite-state source models. Also disclosed is a technique for transforming more general source models into such a separable form.

9 Claims, 16 Drawing Sheets

```
procedure (G, F, H, H) do begin
    for t ∈ G, y ∈ [0, H] do begin
        U(t; y) := H(t; y)
        A(t; y) := false
    end
    π̂ := path by (22) using U in place of F
    Q := {i | A(t̂_i; ξ̂_i) = false}
    while Q ≠ ∅ do begin
        for i ∈ Q do begin
            U(t̂_i; ξ̂_i) := F(t̂_i; ξ̂_i)
            A(t̂_i; ξ̂_i) := true
        end
        π̂ := path by (22) using U in place of F
        Q := {i | A(t̂_i; ξ̂_i) = false}
    end
    return (π)
end
```

FIG. 9

H9vZBbbgJRm4tEx:sZBf3kfAL0:kos
F0AMMqDUCH;p:8ax32K0UFD[zmL
sO9ycs:KzrmbXj]wiXZJAXgd?5q8E2ahZ
,J77y][xF]tIbSf.hiJIlR,SXIJt
.kwE5tNqi4k3r!!eB?sLtNi1jhjQusRnG4ssvPCc?!dhtLldinV.mq9KjQ
iGo2Du!upnFFwOmNJ2Iqv:M!]3,nWCuHUz2J4PWxJcBbDN,2plpZRVPcHU5hr9MQ
nYh,LHnN4TDlrOQZ9i?co[KB6uyE1gS5R0n3?1VAsCwXYhAD4
vbOea4ewmupV98,hEYU!bHWPn9uRLlWJheX,cwcVYL0pE5,a.;B?,X:cSVW]uy;5!Un
J0::UPWt88z6o.
U.1Kv2cH1Jl:n?zLeQPumlOjw54ORPK7y

| Step | Start Node | Start Position | Character | Image | End Node | End Position |
|---|---|---|---|---|---|---|
| 1 | 205 | (0,0) | b | | 210 | (1,0) |
| 2 | 210 | (1,0) | a | | 210 | (2,1) |
| 3 | 210 | (2,1) | a | | 210 | (3,2) |
| 4 | 210 | (3,2) | $ | | 215 | (3,2) |
| 5 | 215 | (3,2) | ⎯ | | 220 | (4,0) |

FIG. 18

FIG. 23 procedure $\mathcal{H}_{wp}(t; y)$ do begin
    $(h_0 \ldots h_{L-1})$ := *projection weight vector* $(\vec{h})$ *for t*
    $B$ := *distance of baseline below top of* $\vec{h}$
    $\mathcal{K}$ := *heuristic coefficient for t*
    $\mathcal{H} := 0$
    for $i = 0 \ldots L - 1$ do begin
        $y' := y - B + i$
        $z_i := 0$
        for $x = 0 \ldots W - 1$ do begin
            $z_i := z_i + Z(x, y')$
        end
        $\mathcal{H} := \mathcal{H} + h_i * z_i$
    end
    return $(\mathcal{K} * \mathcal{H})$
end

FIG. 24 procedure $\mathcal{H}_{ar}(G, \mathcal{U}, \mathcal{A})$ do begin
    for $t \in G$ do begin
        $\mathcal{K}$ := *adjacent row coefficient for t*
        for $y = 0 \ldots H$ do begin
            If $\mathcal{A}(t; y-1)$ and $\neg \mathcal{A}(t; y)$ do begin
                $\mathcal{U}(t; y) := \min \{\mathcal{U}(t; y), \mathcal{K} * \mathcal{U}(t; y * 1)\}$
            end
        end
    end
end

FIG. 25 procedure Separate ($\tilde{G}$) do begin
    $G_0$ := new (empty) graph
    $\mathcal{N}_{TC}$ := ∅
    for $n \in$ Nodes ($\tilde{G}$) do begin
        If $n$ tightly constrained in $\chi$ do begin
            $\mathcal{N}_{TC}$ := $\mathcal{N}_{TC} \cup \{n\}$
            AddNode ($n, G_0$)
        end
    end
    for $t \in$ Transitions ($\tilde{G}$) do begin
        If $\mathcal{L}_t \in \mathcal{N}_{TC}$ and $\mathcal{R}_t \in \mathcal{N}_{TC}$ do begin
            Add Primitive Transition ($t, G_0$)
        end
    end
    for $(n_i, n_f) \in \mathcal{N}_{TC} \times \mathcal{N}_{TC}$ do begin
        $\tilde{G}(n_i; n_f)$ := CopyGraph($\tilde{G}$)
        $\mathcal{N}$ := $\mathcal{N}_{TC} - \{n_i, n_f\}$
        for $t \in \tilde{G}(n_i; n_f)$ do begin
            if $\mathcal{L}_t \in \mathcal{N}$ or $\mathcal{R}_t \in \mathcal{N}$ or $\mathcal{R}_t = n_i$ or $\mathcal{L}_t = n_f$ or ($\mathcal{L}_t = n_i$ and $\mathcal{R}_t = n_f$)
            do begin
                Delete Transition ($t, \tilde{G}(n_i; n_f)$)
            end
        end
        for $n \in \mathcal{N}$ do begin
            Delete Node ($n, \tilde{G}(n_i; n_f)$)
        end
        if $n_i$ connected to $n_f$ in $\tilde{G}(n_i; n_f)$ do begin
            $G_{(n_i; n_f)}$ := subgraph of $\tilde{G}(n_i; n_f)$ connected to both $n_i$ and $n_f$
            if $G_{(n_i; n_f)}$ has constant y displacement do begin
                Create Recursive Transition ($G_0, n_i, n_f, G_{(n_i; n_f)}$)
            end
            else do begin
                return ("not separable")
            end
        end
    end
    return ($G_0$)
end

DOCUMENT IMAGE DECODING USING MODIFIED BRANCH-AND-BOUND METHODS

This invention relates to image decoding and recognition techniques, and in particular to such techniques using stochastic finite state (Markov) source models.

RELATED CASES

A commonly-owned, U.S. application Ser. No. 07/762,290, filed Sep. 19, 1991, now U.S. Pat. No. 5,199,077 entitled "Wordspotting For Voice Editing And Indexing".

A commonly-owned, U.S. application Ser. No. 07/805,700, filed Dec. 10, 1992, now U.S. Pat. No. 5,321,773 entitled, "Image Recognition Method Using Finite State Networks", of which the present case is a continuation-in-part.

BACKGROUND OF INVENTION

Automatic speech recognition systems based on hidden Markov models (HMMs) and other stochastic grammar frameworks are known. Examples are described in. U.S. Pat. No. 5,199,077, and reference [5]. Bracketed numerals identify referenced publications listed in Appendix A. HMMs have also been applied to document image recognition problems. The most comprehensive of these attempts, called document image decoding (DID), is based on an explicit communication theory view of document recognition. See U.S. Pat. No. 5,321,773, and references [6,7,8,9,10]. In the DID model, as shown in FIG. 1 of U.S. Pat. No. 5,321,773, a stochastic message source selects a finite string M from a set of candidate strings according to a prior probability distribution. The imager converts the message into an ideal binary image Q. The channel maps the ideal image into an observed image Z by introducing distortions due to printing and scanning, such as skew, blur and additive noise. Finally, the decoder receives image Z and produces an estimate $\hat{M}$ of the original message according to a maximum a posteriori (MAP) decision criterion.

The structure of the message source and imager is captured formally by modeling image generation using a Markov source, as depicted in FIG. 1. Decoding an image with respect to a Markov source involves finding the best (MAP) path through a three dimensional (3D) decoding trellis indexed by the nodes of the model and the coordinates of the image plane. A straightforward approach to MAP decoding is to use a two-dimensional form of segmental Viterbi algorithm to compute a set of recursively-defined likelihood functions at each point of the image plane. The time complexity of Viterbi image decoding is $O(\|\beta\| \times H \times W)$, where $\|\beta\|$ is the number of branches in the source model and H and W are the image height and width, respectively, in pixels. Although the computation grows only linearly with image size, in absolute terms it can be prohibitive. For example, a simple three state model for a column of text in a single known font takes about 45 minutes to run on an 8.5 in×11 in image scanned at 300 dpi resolution. Thus, methods for decreasing the required computation are essential if DID is to become a practical approach to document image analysis.

In the case of text column transcription, the complexity of image decoding arises because, in effect, each row of the image is evaluated as a possible text line. Thus, for example, line decoding occurs 3300 times for an 11 in image (300 dpi×11 in). Conventional approaches to document recognition attempt to avoid this problem by performing text recognition only on the actual text lines of a column, which typically number less than 50. They do this by using simple segmentation algorithms, such as horizontal pixel projection, to detect and locate text lines prior to recognition[2].

Conventional segmentation algorithms could be used prior to image decoding as well, in a manner analogous to their use with 1D HMM-based approaches to text recognition[4,5]. However, pre-decoding segmentation can be unreliable, particularly for highly degraded (noisy) images. Moreover, since conventional segmentation algorithms are not based on a rigorous probabilistic formulation, their use would negate many of the theoretical advantages of DID.

SUMMARY OF INVENTION

An object of the invention is an improved DID system.

A further object of the invention is a DID system having reduced computational cost.

Another object of the invention is a DID system that provides the optimality of the straightforward Viterbi procedure but at a reduced computational cost.

The invention achieves a reduction in the computational cost of image decoding without sacrificing the optimality of the straightforward Viterbi procedure. In accordance with a first aspect of the invention, the image decoding system employs an informed best-first search algorithm, called the iterated complete path (ICP) algorithm, that is similar to branch-and-bound, A*, and related heuristic search and optimization techniques[12]. ICP is a decoding algorithm for a class of Markov source models called separable models. Loosely, a separable source is one that may be factored into a product of 1D models that represent horizontal and vertical structure, respectively. More formally, a separable model is a collection of named Markov subsources that is similar to a recursive transition network[3]. Associated with some of the nodes of the model are position constraints that restrict entry to the node to certain regions of the image plane. The top-level subsource is a vertical model whose nodes are all tightly constrained to specific horizontal positions.

Decoding with a separable model in accordance with the invention involves finding the best path through the 2D decoding trellis defined by the nodes of the top-level model and the vertical dimension of the image. Some of the branches of the vertical model are labeled with horizontal models. The match score for such a branch is computed by running the horizontal model along the appropriate row of the image. The overall decoding time for a separable model is dominated by the time required to run the horizontal models. ICP reduces the number of times the horizontal models are run by replacing full decoding of most horizontal rows with computation of a simple upper bound on the score. These upper bounds are called heuristic functions.

In accordance with a second aspect of the invention, two types of parameterized heuristic functions are presented that are useful for separable models of text-like images. One type corresponds to the common use of horizontal pixel projection to locate text lines. The second heuristic bounds the score for a given row in terms of the score of an adjacent row. An important feature of both of these heuristics is that their parameters can be automatically inferred from the source model.

Separable sources are special forms of recursive constrained sources, which in turn are obtained by introducing node position constraints to the class of simple sources introduced previously [8]. In accordance with a third aspect of the invention, we describe a procedure for transforming certain constrained sources into separable form. An important component of the separation procedure is an algorithm for propagating user-specified position constraints, which are typically supplied for a small subset of the nodes, to the remaining nodes of the model.

Summarizing, the invention comprises a text-like image decoding system and method comprising a fast heuristic search algorithm using stochastic finite state (Markov) separable source models in the form of HMMs. The new search algorithm (ICP), which is patterned after well-known branch-and-bound methods, significantly reduces the complexity and increases the speed of HMM image decoding without sacrificing the optimality of the straightforward DID procedure. By "text-like images" is meant any type of artificial image which is typeset using text-like templates; this includes, but is not limited to, text, equations and music. Examples of documents incorporating text-like images are business letters, technical journals, patents and patent applications, sheet music and engineering drawings.

The above and further objects, details and advantages of the present invention will become apparent from the following detailed description of preferred embodiments thereof, when read in conjunction with the accompanying drawings.

SUMMARY OF DRAWINGS

FIG. 9 shows an example text page image in 12 pt Adobe Times Roman.

FIG. 10 shows one form of a weighted projection heuristic $H_{wp}$ (dash line) in accordance with the invention and actual score F (solid line) functions for the image of FIG. 9.

FIG. 18 shows step-by-step construction of the resultant output image bitmap for the string of FIG. 17.

FIG. 23 shows one form of the weighted projection heuristic.

FIG. 24 shows one form of the adjacent row heuristic.

FIG. 25 shows one form of the constrained source separation procedure.

DETAILED DESCRIPTION OF PREFERRED EMBODIMENT

Figure 1:
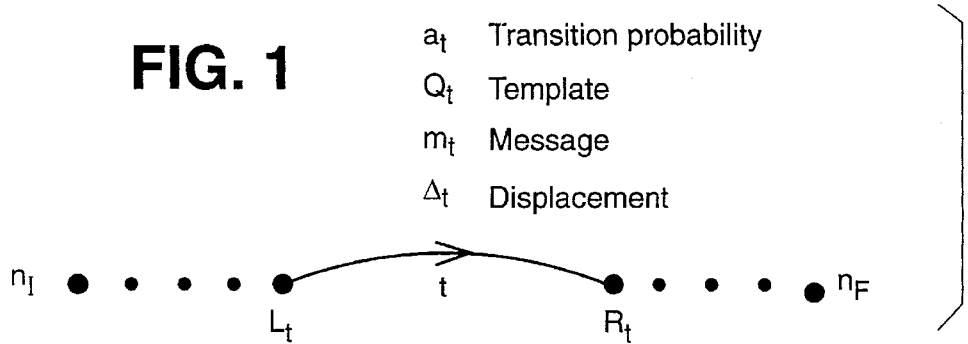
FIG. 1 shows a simple Markov source model for image generation.

U.S. Pat. No. 5,199,077 describes an HMM based word-spotting system employing a Viterbi search with partial traceback. The description given therein of the HMM modeling process and scoring techniques are hereby incorporated by reference.

The related case, application Ser. No. 07/805,700, which issued as U.S. Pat. No. 5,321,773, describes an optimal general approach for image decoding and recognition application, also using HMM modeling, whose contents are herein incorporated by reference.

As further background, the reader is referred to the excellent tutorial on HMMs by L. R. Rabiner that appeared in PIEEE, Vol. 77, No. 2, pgs. 257–285, Feb. 1989.

The reader is also referred to a publication by two of the inventors entitled "Automatic Generation Of Custom Document Image Decoders", the contents of which are hereby incorporated by reference. This publication summarizes the description given in U.S. Pat. No. 5,321,773 and provides an excellent tutorial for the reader to understand the present invention and how it differs from the parent application.

Briefly summarizing, the parent application describes a decoding process which requires an image source model, a channel model, and a decoder. The source model used is a Markov source model comprising a finite state network made up of a set of nodes and a set of directed transitions into each node. The network is characterized by an initial state and a final state. Each transition has associated with it a 4-tuple of attributes, comprising a template, a label or message string, a transition probability, and a 2-dimensional integer vector displacement. Decoding involves determining the most likely path through the network from the initial to the final state. When that is accomplished, then the message strings associated with the transitions of the most likely path are concatenated to form a description of the decoded image. Each message string can also be used to reconstruct a version of the input image by overlapping the templates associated with the transitions of the most likely path.

Since there are typically many transitions into each node, a search algorithm based on the known Viterbi algorithm to determine the most likely path can be used, as explained in the parent application, by iterating over each image position and each transition into every node and computing the likelihood of the best path that terminates at the node and image position after passing through the transition. Part of this computation involves computing the likelihood that the template of the transition corresponds to a region of the image to be decoded in the vicinity of the image point.

The present invention is directed to an improvement in the search algorithm, and specifically teaches how to compute the scores for a reduced set of transitions into each node, the reduced number of transitions being substantially smaller than the number of all possible transitions into the node. Since the computation is highly regular, reducing the number of transition score computations substantially reduces, nearly proportionally, the computation time required to decode the image. The number of iterations is reduced by using one or more heuristics to bound the transition scoring. In other words, it will allow particular transitions to be abandoned as not likely to contain the best path, thereby reducing computation time.

As will be clear from the referenced tutorials, in the prior art and in the parent case, full decoding of all transitions was carried out to determine the most likely path. In the invention, in contrast, by using the class of Markov source models called separable models, and by performing decoding with the ICP algorithm, together with appropriate heuristic functions, full decoding of each transition can be replaced by a shorter computation of a simple upper bound on the transition score. This enables discarding of a large proportion of the possible transitions, so that full decoding using the longer computation needs to be carried out only over a much smaller number of possible transitions. The replacement of many long transition score computations with shorter heuristic score computations is responsible for the remarkable decrease in overall computation time in accordance with the invention, in one example by a factor of 11 and in another example by a factor of 19 as will be later described.

The present invention builds on the optimal techniques described in the parent application, and to assist the reader, it is worthwhile to include a description of the synthesizer and decoding process as described in the parent case.

There will now be described in detail one way, which is not intended to be limiting, for implementing the system of the invention described in U.S. Pat. No. 5,321,773 using concepts associated with finite-state image generators of the stochastic type well established in this and the related field of speech processing.

Figure 3:
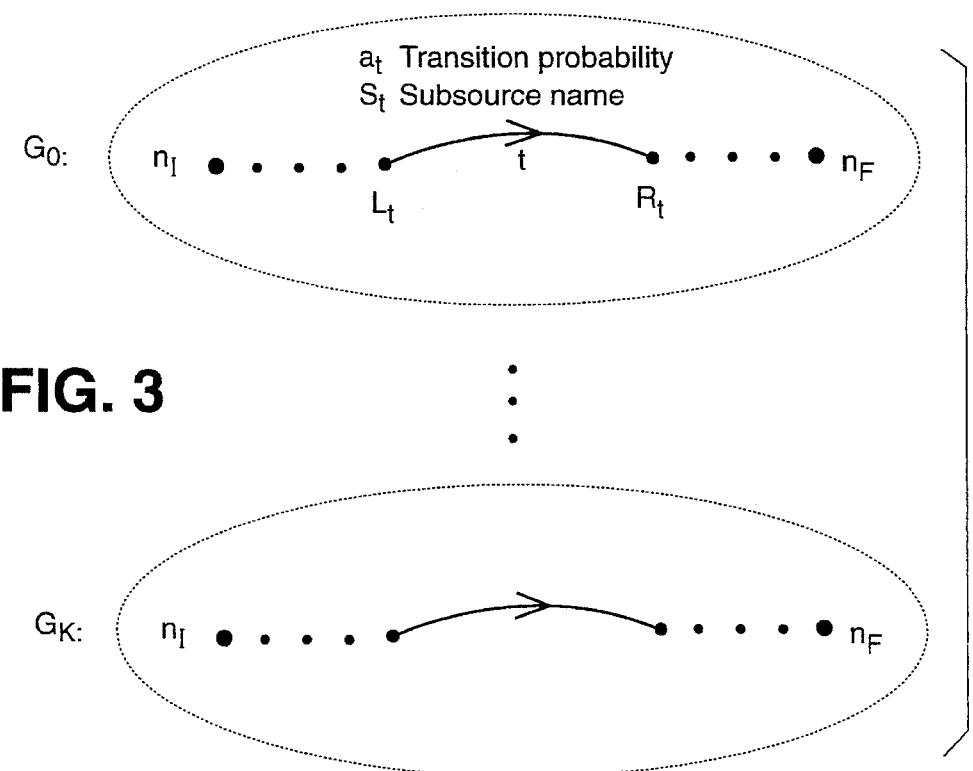
FIG. 3 shows a recursive Markov source, showing a recursive branch in top-level subsource $G_0$. Sub-sources may also include simple branches and position constraints.
Figure 15:
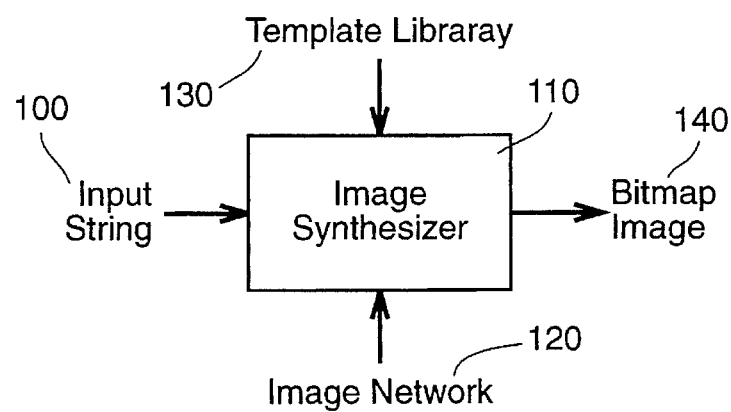
FIG. 15 is a block diagram of one form of image synthesizer.

FIG. 15 shows the method applied for image synthesis. An image synthesizer 110 (a.k.a. imager) takes as inputs a description of a class of images expressed as an image network 120, a library of image templates 130 each listing the parameters of a typographic model of a particular character as indicated in FIG. 3 of the parent application , and a character string 100 which is used to specify some particular image from the class described by the image network. The output of the imager 110 is a bitmap image 140 formed by arranging a set of constituent images drawn from the template library 130. This is analogous to the stack of transparencies previously used to explain the imaging process. The identities and spatial positions of the constituent images are determined jointly by the input string 100 and the image network 120.

Figure 16:
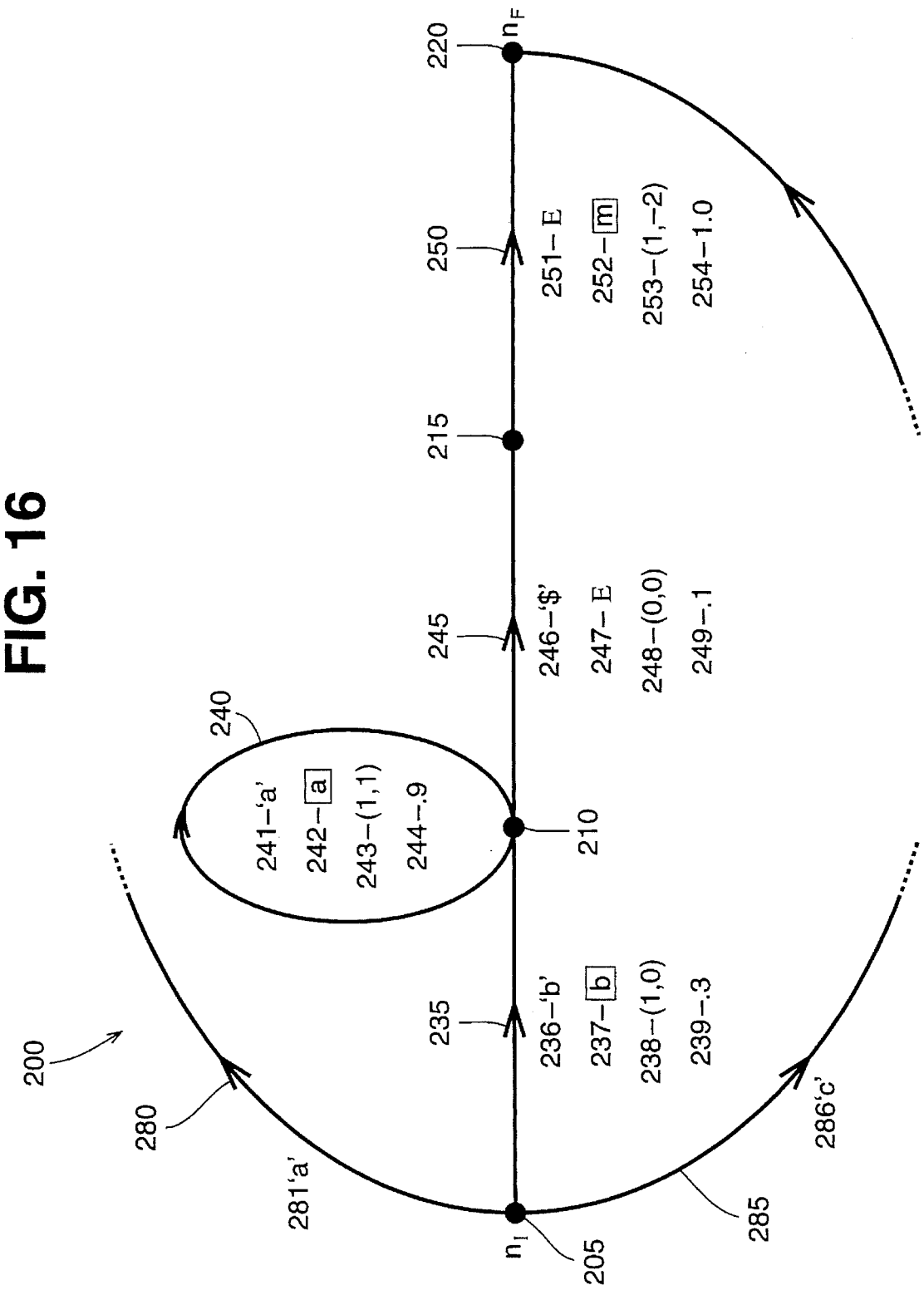
FIG. 16 shows an example of a finite state transition network of the type used in the synthesizer of FIG. 15.

FIG. 16 shows an example of an image network 200, which is similar to a finite-state transition network of the sort commonly used to represent finite-state grammars. The image network 200 consists of a set of nodes, e.g., 205, 210 which are interconnected by directed branches, e.g. 235, 240. Branch 235, for example, is said to exit node 205 and enter node 210. Nodes are sometimes called states or vertices; branches are sometimes called transitions or edges. Two distinguished states of the network are a start state 205 and a final state 220, labeled $_{nI}$ and $_{nF}$, respectively. Each transition is labeled with four attributes: a message, or the name of a character in this case, e.g., 236, 241, the name of an image template, e.g. 237, 242, a two-dimensional displacement vector, e.g. 238, 243, which consists of horizontal and vertical displacements, dx and dy, respectively, and a transition probability, e.g. 239, 244. The character label or image template may be null, as in character 251 of branch 250 or template 247 of branch 245. The transition probabilities are used during image decoding, but not during image synthesis. Given an input string and an image network, the imager synthesizes an output image traversing the branches of the image network while updating an image position pointer and copying templates from the template library into the output image array, as follows.

The imager starts in initial state 205 with the image position pointer initialized to coordinates (0,0) of the output image array. The first character of the input string is compared with the character labels 281, 236 and 286 on branches 280, 235 and 285 which exit from node 205. If one of the branch labels matches the input character, the imager selects the corresponding branch and performs the following actions. For illustration, suppose that the first character of the input string is a 'b'. In that case, the imager will select branch 235, since 'b' matches the character label 236. If branch 235 is selected, the imager draws a copy of image template 237 associated with branch 235 into the output array, with the origin of the template aligned at the current image position, (0). The current image position is then incremented by the displacement 238 associated with branch 235 and becomes (1 0). Finally, the imager moves to node 210 by following selected branch 235. The imager repeats this process at node 210. The imager examines the second character of the input string and compares it with labels 241 and 246 on the branches which exit node 210, and selects the matching branch. If, for example, the second character is an 'a', branch 240 is selected. In that case, a copy of template 242 for branch 240 is drawn into the output image array at the current image position, which is (1 0). The current image position is incremented by displacement 243 to become (2 1) and the imager moves again to node 210.

This process continues until all the characters of the input string have been processed. At that point the imager should have reached the final state 220 or be able to reach the final state by selecting branches with null character labels. An error occurs if the imager cannot reach final state 220 at the time the input string is exhausted. An error also occurs if, at some point of the process, no branch matches the current input character. A problem also occurs if more than one branch matches the current character. Methods for generalizing the above process description to handle these and other exceptional situations are well-known in the literature of finite-state languages.

Figure 17:
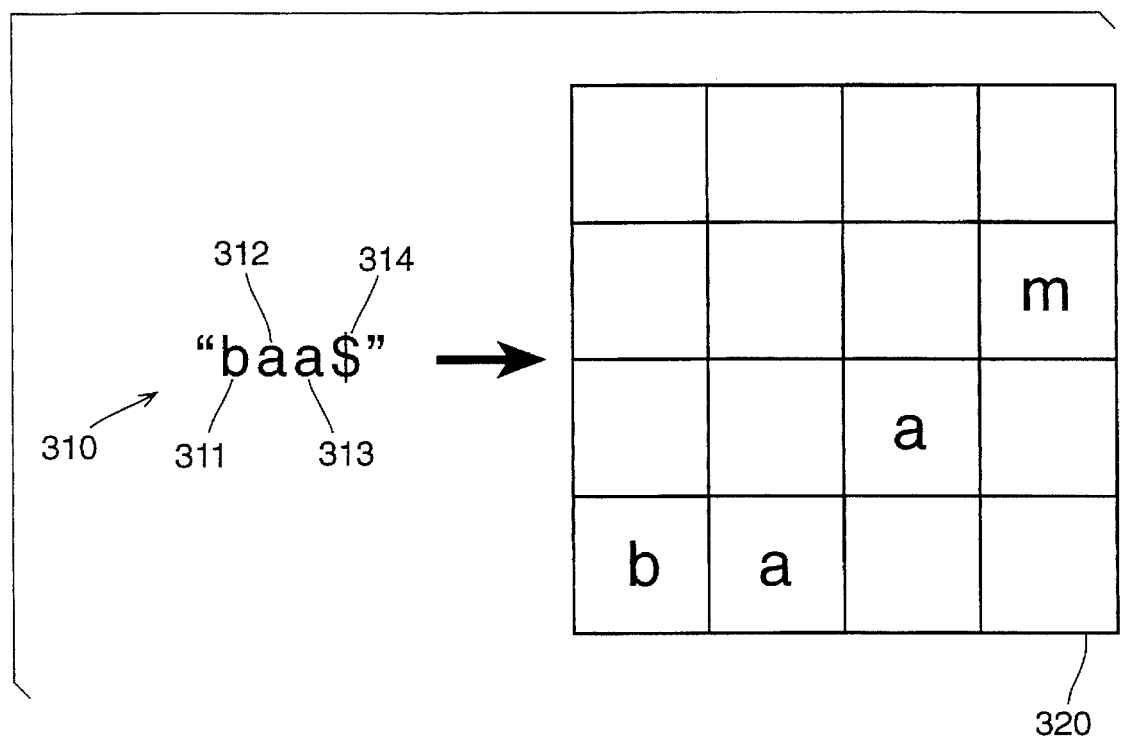
FIG. 17 illustrates operation of the network of FIG. 16 on a sample string.

FIGS. 17 and 18 illustrate the complete process for the image network 200 shown in FIG. 16 and the input string "baa$" 310. FIG. 17 shows the image 320 which is produced when string 310 is processed according to network 200. The steps 1–5 of the synthesis process are detailed in the table of FIG. 18. Prior to step 1, the imager is in initial state 205 at position (0 0) of the output array, which is blank. During step 1, the imager compares the first input character 311 with the labels of the three branches 280, 235 and 285 which exit node 205. The input character matches the label 236 on branch 235. The imager draws a copy 411 of template 237 associated with branch 235, in this case an image of a 'b', into the output array at location (0 0) and moves to node 210 and image location (1 0). In this example, the alignment point of every template is assumed to be the lower left corner of the template. In the image column of FIG. 18 the image location at the start of step 1 is indicated in image 410 with a dot "." 412. The image location at the end of step 1 is indicated with an "X" 414. Images 420, 430, 440, and 450 for steps 2–5 are marked similarly.

During step 2, the imager, starting in state 210, compares the second input character 312 with characters 241 and 246 on branches 240 and 245 which exit node 210. The input character 'a' matches label 241 of branch 240 so the imager deposits a copy 421 of template 242, in this case an image of an 'a', at the current location (1 0), advances the current location by displacement 243 to (2 1) and moves again to state 210.

During step 3, the process is repeated for the third input character 313. The imager selects branch 240, deposits a copy 431 of template 242 at location (2 1), updates the current image location to (3 2) and moves again to node 210.

During step 4, the fourth input character 314 is processed and the imager follows branch 245 to node 215. The image location pointer is not changed, since the displacement 248 associated with branch 245 is (0 0), and no template is copied into the output array, since the template label 247 associated with branch 245 specifies the null template.

At the start of step 5, the imager has exhausted the input string. However, since the character label 251 of branch 250 specifies the null character, branch 250 may be selected. A copy 451 of template 252 for branch 250, an image 'm', is deposited at the current image position (3 2), the imager moves to state 220 and the image location is updated to (4 0). At this point the imager is in the final state 220 and there are no more input characters to process, so the imaging operation is completed successfully. This example also illustrates that there need not be a one-to-one correspondence between the input string symbols and the resultant bitmap image. For instance, the string to be imaged could have in it information corresponding to comments in code not meant to be included in the bitmap. Similarly, the recognizer could include in its output information about the bitmap (such as its source) not present in the bitmap itself. Also, the bitmap symbols could be different than the string symbols (note '$' in the string and 'm' in the bitmap), and no symbol need be present in the bitmap if the recognizer will automatically generate a character under certain prescribed conditions.

Figure 19:
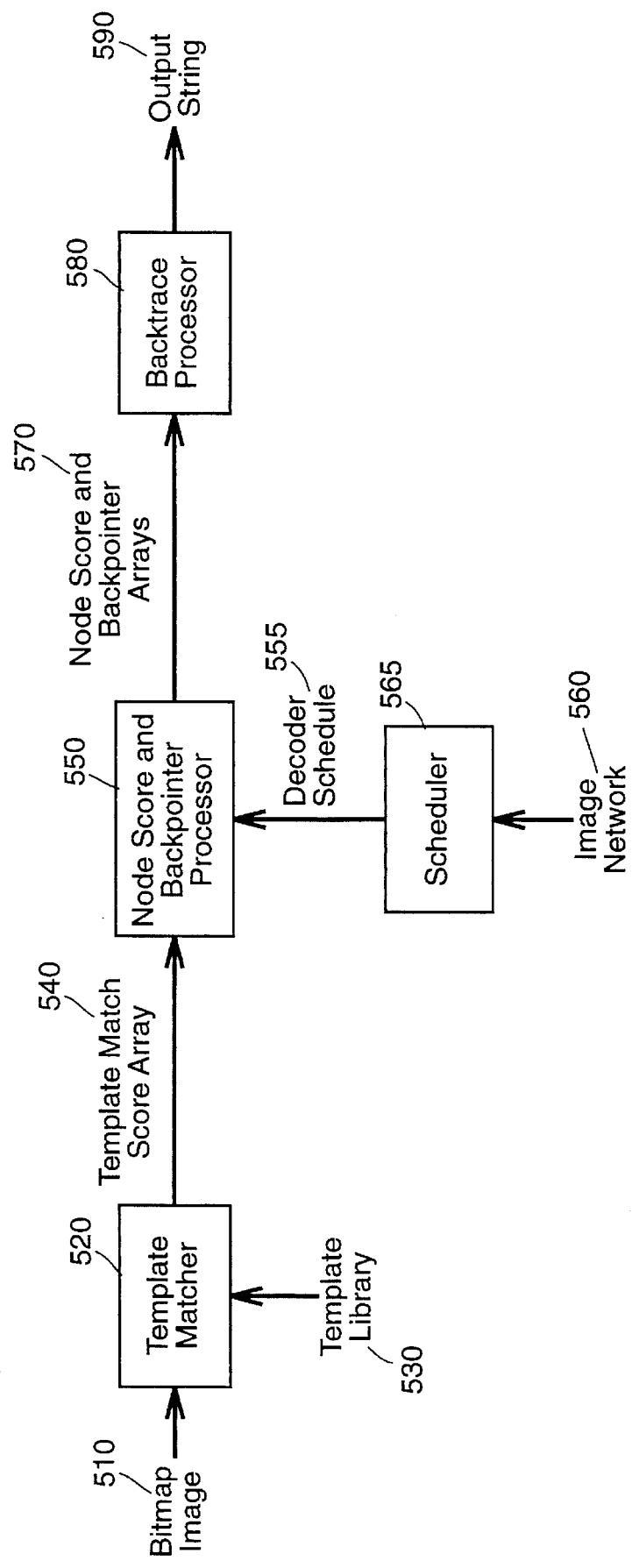
FIG. 19 is a block diagram of one form of image recognizer that could be used with the invention for decoding an image bitmap to reconstruct the string from which it was formed.

FIG. 19 shows the reverse process, namely, the use of an image network for decoding an input bitmap 510 to generate an output string 590. This is the part of the system that is improved by the present invention. For the example given in FIG. 17, the same image network 200 would be used. The template matcher 520 compares each member of the template library 530 (which is the same as the template library 130 used in the imager of FIG. 15) with the input image 510, using a matching function which computes $\mathcal{L}(Z|Q)$ as defined in the parent case. The output of the template matcher is a set of score arrays 540, one for each template from the library, which contains the numerical match score for the template at each location of the input image. The node score and backpointer processor 550 computes a score array and a backpointer array 570 for each node of the image network 560. The score for a node contains the numerical match score $\mathcal{L}(n; \vec{x})$ defined in the parent case for that node aligned at each location of the input image. The backpointer array for a node identifies the most likely branch into the node, that is, the branch at each image location which maximizes the score. The inputs to the node score and backpointer processor 550 are the template match scores 540 for the template matcher and a decoder schedule 555 from image network 560, which is the same image network 120 used in the imager FIG. 15. Finally, the backtrace processor 580 uses the backpointer array 570 to generate a path through the image network 560, and from this path, an output string 590 is formed by concatenating the character labels of the branches of the path. This will, for the example given in FIG. 17, reconstruct the string "baa$".

One form of an algorithm that when executed by the node score and backpointer processor 550 will produce the arrays 570 as described above is described in detail in FIG. 20. Processor 550 fills the node score and backpointer arrays 570 in row-major order—all values are computed for the first row, then all values are computed for the second row, and so on, until all rows are completed. The computation for each row in turn is organized as a series of "passes". During each pass, one row is computed for each array in some subset of the score and backpointer arrays. A row is computed either left-to-right, in order of increasing x position, or right-to-left, in order of decreasing x position, again, as specified by the schedule. A left-to-right pass is called a "forward" pass; a right-to-left pass is called a "reverse" pass. At each x position within a pass, the scores and backpointers are computed for some subset of the nodes of the image network, in a prescribed order.

Figure 20:
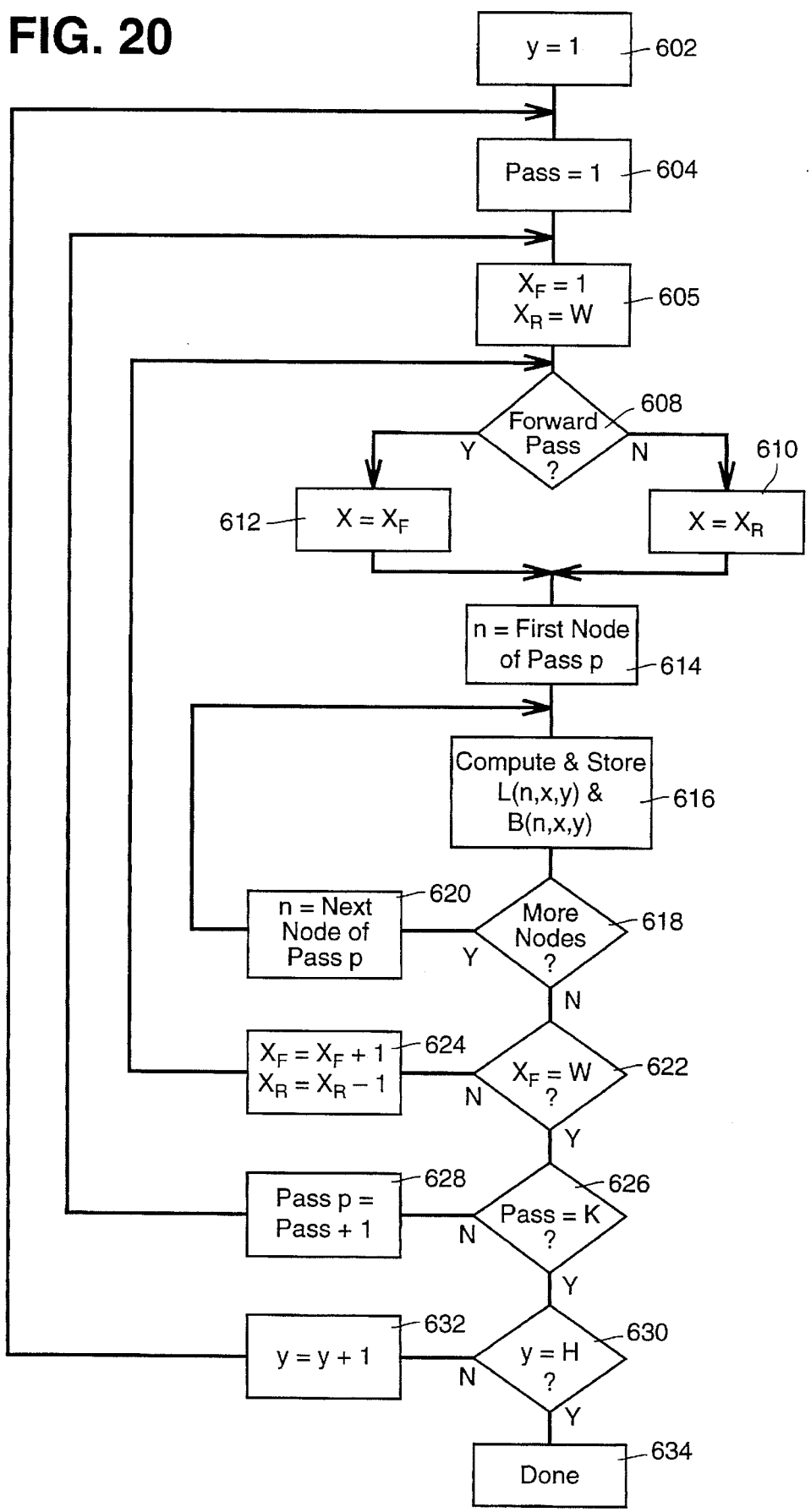
FIG. 20 is a flow chart of an example of one form of algorithm that the node score and backpointer processor of FIG. 19 can use.

The algorithm in FIG. 20 is a nested iteration with 4 levels. The outermost level, steps 602 through 632, iterates over rows. Step 602 initializes the row counter y to 1. In step 630 the row counter is compared with number of the rows in the image, H. If not all rows have been computed, the row counter is incremented in step 632 and the next row is processed. The second level, steps 604 through 628, iterates over passes. The pass counter is initialized in step 604, compared with the total number of passes K in step 626, and incremented in step 628. The third level, steps 605 through 624, iterates over horizontal position within the row specified by row counter y. Three horizontal position pointers are maintained simultaneously. Pointer $X_R$ specifies horizontal position for the forward passes. $X_F$ is initialized to 1 in step 605, incremented in step 624, and compared in step 622 with the number of locations within a row, W. Pointer $X_R$ is the horizontal position for backward passes. It is initialized to W in step 605 and decremented in step 624. Pointer X is set in steps 608, 610 and 612 to either $X_F$ or $X_R$, according to whether the current pass is forward or backward. The fourth level of the iteration, steps 614 through 620, computes the score L(n,x,y) and backpointer B(n,x,y) for each node n of the pass specified by the pass counter at the row specified by y and the horizontal position specified by x. The actual computation of score L(n,x,y) and backpointer B(n,x,y) occurs in step 616, which is described in FIG. 21.

Figure 21:
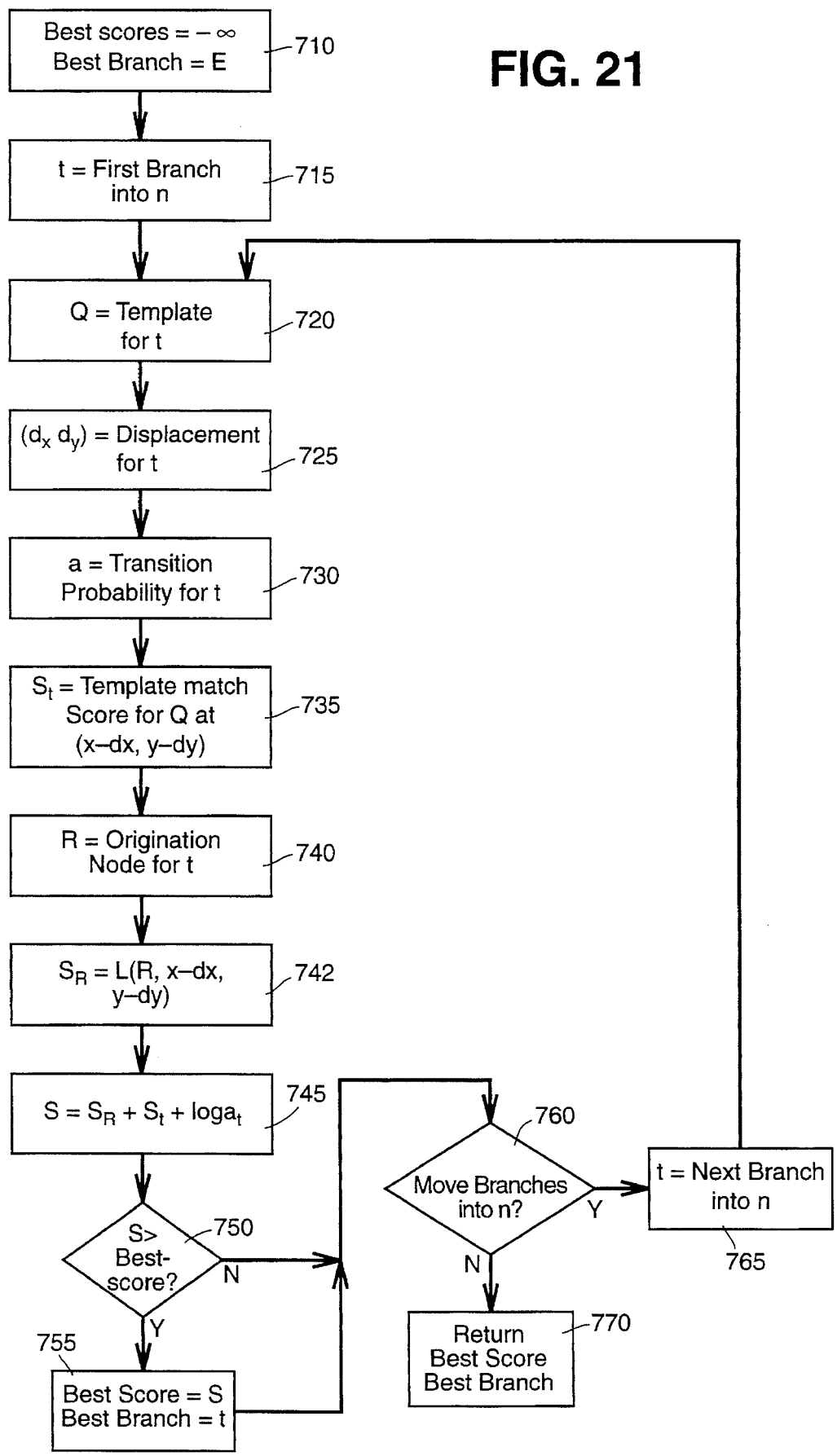
FIG. 21 is a flow chart illustrating the computations carried out during step 616 of the process of FIG. 20.

FIG. 21 describes an example of the computation of the node score L(n,x,y) and backpointer B(n,x,y) for a particular node n and image position (x y). This algorithm is a two-dimensional generalization of the standard one-dimensional dynamic programming step used in speech recognition with hidden Markov models. The computation involves finding that branch, among all branches which enter the specified node n, which maximizes the score of the node at the specified image position (x y). The maximum score and the identification of the corresponding best branch are returned in step 770 as L(n,x,y) and B(n,x,y). During the course of the computation, variables bestscore and bestbranch, initialized in step 710, contain the best score, and the corresponding branch, encountered thus far.

Steps 715 through 765 iterate over the branches which enter node n. Steps 715 initializes the branch index t to the first branch into n; steps 760 and 765 repeat the iteration until all branches of n have been considered. Steps 720, 725, and 730 retrieve the template Q, displacement (dx dy) and transition probability a associated with branch t. These correspond to the attributes of the branches or transitions illustrated in FIG. 16. Step 735 retrieves the template match score for template Q at image position (x-dx y-dy) from the template score arrays which were previously supplied as input 540 to the node score and backpointer processor 550. Step 740 retrieves the identification of the node R from which branch t originates and step 742 retrieves the node score value L(n,x,y) for node R at image position (x-dx, y-dy). This value was computed during a previous execution of the algorithm in FIG. 21; the decoder schedule 555 should insure that any node score values required to compute L(n,x,y) during the current computation are available through previous computation. Step 745 computes the candidate node score for the current branch. Finally, steps 750 and 755 update bestscore and bestbranch if the candidate score computed in 745 is greater than the previous value of bestscore.

The template matcher 520 computes L(Z|Q) for each template Q, aligned at each image location. Implementation is straightforward.

The scheduler 565 produces a schedule 555 from image network 560. The schedule specifies the order in which the entries in the node score and backpointer arrays 570 are computed, and should insure that data dependencies are obeyed.

Figure 22:
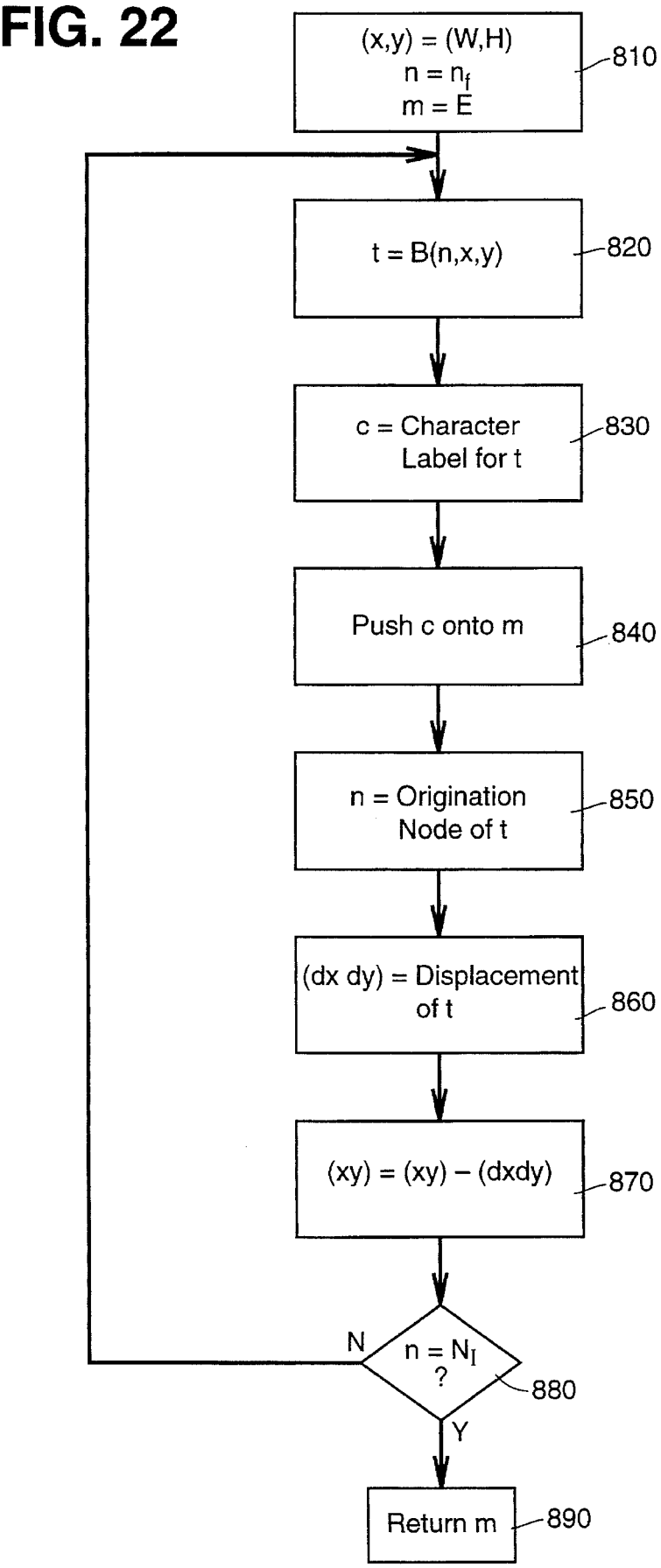
FIG. 22 is the flow chart of one form of algorithm that the backtrace processor of FIG. 19 can use.

The backtrace processor 580 computes output string 590 from the node score and backpointer arrays 570, using the algorithm as an example described in FIG. 22. The backtrace processor traces back from the final node nF at image position (W H) by successively following the branches identified in the backpointer array until the start node $n_I$ is reached. The character labels on the branches encountered during this backtrace are concatenated to form the output string 590.

Step 810 initializes the current image position (x y) to (W H), initializes the current node n to the final node $n_F$, and initializes the output string m to the null string. Step 820 sets t to the branch B(n,x,y) which was previously computed by the node score and backpointer processor 550. The character label 'c' for branch t is retrieved in step 830 and pushed onto the beginning of string m in step 840. Step 850 updates n to the node from which branch t originates and step 860 retrieves the displacement (dx dy) for branch t. Step 870 updates the current image position (x y) by subtracting the displacement (dx dy). The new value of node n established in step 850 is compared with $n_I$, the start node of the image network, in step 880. If $n_I$ has been reached, the backtrace terminates in step 890 and returns the string m. Otherwise, the process repeats from step 820.

The present invention requires considerable mathematics to understand and to learn how to reproduce the invention. To assist the reader, the subsequent sections are organized as follows.

Section 1 defines the class of separable Markov sources and the related classes of constrained and recursive sources. Section 2 describes the iterated complete path algorithm (ICP) of the invention. Section 3 defines the parameterized horizontal projection and adjacent row heuristic functions of the invention. Section 4 presents an algorithm for testing constrained sources for separability and performing the conversion when possible in accordance with the invention. This section also discusses the propagation of user-specified constraints prior to separation. Finally, section 5 presents experimental results illustrating the speedup possible using ICP and the heuristics.

1. Separable Markov Sources

This section develops the notion of a separable source on which ICP is based. We begin with a review of the image models introduced in [8], which we will call the simple Markov sources. Simple sources are then generalized to constrained sources by introducing node position constraints and to recursive sources by allowing one source to recursively "invoke" another. Separable models are then defined as a special class of recursive sources. The section concludes with examples of source models and constraints for a simple column of next in a single font.

1.1 Simple Markov Sources

A simple Markov source G, illustrated in FIG. 1, is a directed graph consisting of a finite set of N states (nodes, vertices)

$$\mathcal{N} = \{n_1 \ldots n_N\} \quad (1)$$

and a set of B directed transitions (branches, edges)

$$\mathcal{B} = \{t_1 \ldots t_B\} \quad (2)$$

Each transition t connects a pair of states, $L_t$ and $R_t$, that are called, respectively, the predecessor (left) state and the successor (right) state of t. Two distinguished states are the initial state $n_I$ and the final state $n_F$. With each transition is associated a 4-tuple of attributes, $(Q_t, m_t, a_t, \vec{\Delta}_t)$, where $Q_t$ is the template, $m_t$ is the message string, $a_t$ is the transition probability, and $\vec{\Delta}_t = (\Delta x_t, \Delta y_t)$ is the 2-dimensional integer vector displacement. The type of transition found in a simple Markov source will be called a simple transition.

A path $\pi$ in a Markov source is a sequence of transitions $t_1 \ldots t_P$ for which $$R_{t_i} = L_{t_{i+1}} \quad (3)$$

for i=1, ... P−1. A complete path is a path for which $L_{t_1} = n_I$ and $R_{t_P} = n_F$. A cycle or loop is a sequence of transitions $t_1 \ldots t_P$ for which $L_{t_1} = R_{t_P}$.

Associated with each path $\pi$ is a composite message $$M_\pi = m_{t_1} \ldots m_{t_P} \quad (4)$$

formed by concatenating the message strings of the transitions of the path. A simple Markov source defines a probability distribution on complete paths by $$Pr\{\pi\} = \prod_{i=1}^{P} a_{t_i} \quad (5)$$

and induces a probability distribution on messages by $$Pr\{M\} = \sum_{\pi|M_\pi=M} Pr\{\pi\} \tag{6}$$

where the summation is taken over complete paths. Also associated with each path $\pi$ is a sequence of positions $\xi_0 \ldots \xi_p$ recursively defined by $$\vec{\xi}_i = \vec{\xi}_{i-1} + \vec{\Delta}_{t_i} \tag{7}$$

where $\xi_0$ is an initial position, normally $\vec{0}$. Informally, $\xi_i$ is the position of the graphics cursor after the $i^{th}$ transition of the path.

A path defines a composite image Q by $$Q_\pi = \bigcup_{i=1}^{P} Q_{t_i}[\vec{\xi}_i - 1] \tag{8}$$

where $Q[\vec{x}]$ denotes Q shifted so that the origin of its local coordinate system is located at $\vec{x}$. For a path $\pi$ we will define $$\vec{\Delta}_\pi = \vec{\xi}_P - \vec{\xi}_0 = \sum_{i=1}^{P} \vec{\Delta}_{t_i} \tag{9}$$

to be the displacement of the path and will let $\Delta x_\pi$ and $\Delta y_\pi$ denote the x and y components of $\vec{\Delta}\pi$, respectively.

Note that P and $t_i$ are functions of $\pi$ and that $\xi_i$ and $Q_\pi$ depend on $\xi_0$ as well. The dependence will be indicated explicitly only when necessary to avoid ambiguity, in which case we will write, for example, $\xi_i(\eta;\xi_0)$.

MAP decoding involves finding a complete path $\hat{\pi}$ (and thus $\hat{M}$) that maximizes the path likelihood function, defined by $$\mathcal{L}(\pi) \equiv \mathcal{L}(Z|Q_\pi) + \log Pr\{\pi\} = \sum_{i=1}^{P} [\mathcal{L}(Z|Q_{t_i}[\vec{\xi}_{i-1}]) + \log a_{t_i}] \tag{10}$$

where $\mathcal{L}(Z|Q[\vec{x}])$ is the template match score for Q aligned at position $\vec{x}$ and depends on the channel model. MAP decoding may be implemented by computing the likelihood function $$\mathcal{L}(n;\vec{x}) \equiv \max_{\pi \text{ s.t. } (n_I;\xi_0) \to (n;\vec{x})} \mathcal{L}(\pi) \tag{11}$$

at each $(n,\vec{x}) \in N \times \Omega$, where n is the integer lattice $[0,W] \times [0,H]$. This description uses an image coordinate system in which x increases to the right, y increases downward, and the upper left corner is at $x=y=0$. The notation $$(n_I;\vec{\xi}_0) \to (n;\vec{x}) \tag{12}$$

represents the constraint that $\pi$ is a path from node $n_I$ at image position $\xi_0$ to node n at $\vec{x}$. The likelihoods $\mathcal{L}(n;\vec{x})$ may be computed recursively by $$\mathcal{L}(n;\vec{x}) = \max_{t|R_t = n} \left\{ \begin{array}{l} \mathcal{L}(L_t; \vec{x} - \vec{\Delta}_t) + \\ \log a_t + \\ \mathcal{L}(Z|Q_t[\vec{x} - \vec{\Delta}_t]) \end{array} \right\} \tag{13}$$

using a segmental Viterbi (dynamic programming) algorithm.

The prior probability term $\log Pr\{\pi\}$ in (10) is usually dominated by the observation term $\mathcal{L}(Z|Q_\pi)$ except for highly degraded images. Thus, it can be often be dropped as a convenient approximation. The likelihood function $\mathcal{L}(n, , \vec{x})$ depends implicitly on the start node $n_I$, the initial path position $\xi_0$ and the source model G. When it is necessary to indicate them explicitly we will write $\mathcal{L}(n,\vec{x}|n_I;\xi_0;G)$.

1.2 Constrained Markov Sources

Figure 2:
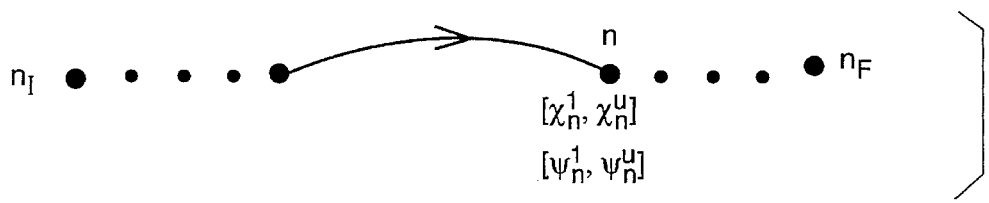
FIG. 2 shows a constrained Markov source.

Many aspects of document layout, such as the locations of column boundaries, page numbers and footnotes, can be naturally expressed in terms of constraints on the absolute positions of image features. Constrained Markov sources provide a framework for expressing and exploiting such constraints within the document decoding paradigm. A constrained Markov source is a simple source in which some or all of the nodes are labeled with x and/or y position constraints, as shown in FIG. 2. Informally, a position constraint specifies lower and upper bounds on the values of x or y when a path passes through a node. Formally, if $R_{t_j}=n$ for some transition $t_j$ of a path in a constrained source, then $$\vec{\xi}_i \in C_n \equiv [\chi_n^l, \chi_n^u] \times [\psi_n^l, \psi_n^u] \tag{14}$$

If $\chi_n^l = \chi_n^u = \chi_n$ we say that node n is tightly constrained in x; similarly, a node is tightly constrained in y if $\psi_n^l = \psi_n^u$. The start and final nodes of a source are typically tightly constrained in both x and y, with $\chi_{n_I} = \psi_{n_I} = 0$ and $\chi_{n_F} = W$ and $\psi_{n_F} = H$.

A constrained source defines a probability distribution on allowed complete paths by $$Pr\{\pi\} = \gamma \prod_{i=1}^{P} a_{t_i} \tag{15}$$

where $\gamma$ is a normalizing factor introduced so that the probabilities sum to unity. Since $\gamma$ is a path-independent constant it does not enter into the decoding computation. For a constrained source, (11) is modified by restricting the maximization to paths that satisfy the constraints, and (13) becomes $$\mathcal{L}(n;\vec{x}) = \left\{ \begin{array}{ll} \max_{t|R_t = n} \left\{ \begin{array}{l} \mathcal{L}(L_t; \vec{x} - \vec{\Delta}_t) + \\ \log a_t + \\ \mathcal{L}(Z|Q_t[\vec{x} - \vec{\Delta}_t]) \end{array} \right\} & \text{if } \vec{x} \in C_n \\ -\infty & \text{otherwise} \end{array} \right. \tag{16}$$

which represents a simple modification to the decoding algorithm. For convenience, we will usually omit the constraint on x and write (16) simply as (13).

As (16) indicates, the computational effect of a position constraint is to restrict the decoding lattice for a node to a subset of the image plane. Thus, position constraints often provide significant computational savings when used with standard Viterbi decoding.

1.3 Recursive Markov Sources

The development of a large source model, such as the yellow page column model described in [8], which contains nearly 6500 branches and 1800 nodes, is facilitated by describing the model hierarchically. The formal basis for hierarchical description is the recursive Markov source, illustrated in FIG. 3. A recursive source is a collection of named subsources $G_0, G_1 \ldots G_K$, each of which is similar to a constrained Markov source except that it may include an additional type of transition. A recursive branch is labeled with a transition probability $a_t$ and the name of one of the subsources, $S_t$. The interpretation of a recursive branch is that it represents a copy of the named subsource. One of the subsources is designated as the top-level subsource of the recursive source and is labeled $G_0$. The start and final nodes of a recursive source are defined to be those of $G_0$.

Figure 4:
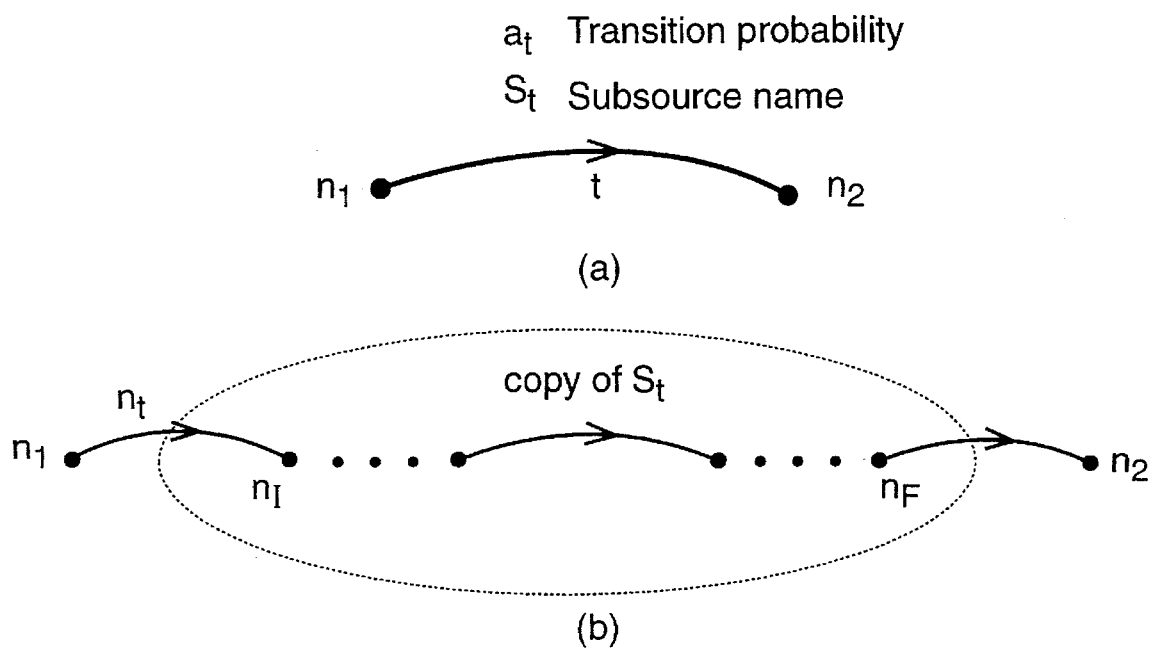
FIG. 4 shows expansion of a recursive transition. (a) Original transition. (b) Result of replacing t with a copy of subsource $S_t$.

The subsources of a recursive source may be viewed as nodes in a directed dependency graph, with a branch from one subsource to another if the first subsource contains a recursive branch labeled with the name of the second. If the dependency graph of a recursive source is acyclic, the source is equivalent to a constrained Markov source derived by repeatedly replacing each recursive branch t in $G_0$ by a copy of $S_t$, until no recursive branches remain. FIG. 4 illustrates one step of the expansion.

The expansion process will terminate if the dependency graph is acyclic; the resulting "flattened" source, denoted $\tilde{G}$, contains only primitive transitions. If the dependency graph contains a cycle, the recursive source is not equivalent to a constrained source, but corresponds to the recursive transition network of a context-free grammar [3]. We assume in this paper that the dependency graphs are acyclic.

Decoding an image with respect to a recursive source is defined to mean decoding it with respect to the equivalent constrained source $\tilde{G}$, so that, for example $$\mathcal{L}(n; \vec{x}|G) \equiv \mathcal{L}(n; \vec{x}|G_0) \equiv \mathcal{L}(n; \vec{x}|\tilde{G}) \tag{17}$$

for $n \in G_0$. Since we are ultimately interested only in the final node likelihood $\mathcal{L}(n_F; W, H)$, it is sufficient to explicitly compute $\mathcal{L}(n; \vec{x})$ only for nodes in the top-level subsource $G_0$. By considering FIG. 4. and the definition of $\mathcal{L}(n, \vec{x}|\tilde{G})$ as a maximum path score, it is not difficult to see that (16) may be written in terms of transitions in $G_0$ as $$(n; \vec{x}|G_0) = \max_{\substack{t \in G_0 \text{ s.t.} \\ R_t = n}} \max_{\vec{x}_1} \left\{ \begin{array}{c} (L_t; \vec{x}_1|G_0) + \\ \log a_t + \\ (n_F(S_t); \vec{x}|n_t(S_t); \vec{x}_1; \tilde{S}_t) \end{array} \right\} \tag{18}$$

where for primitive transitions we define $$(n_F(S_t); \vec{x}|n_t(S_t); \vec{x}_1; \tilde{S}_t) \equiv \left\{ \begin{array}{ll} (Z|Q_t[\vec{x}_1]) & \text{if } \vec{x} - \vec{x}_1 = \Delta_t \\ -\infty & \text{otherwise.} \end{array} \right. \tag{19}$$

The nested maximization over $\vec{x}_1$ is introduced because recursive branches may span image regions of variable size.

1.4 Separable Markov Sources

A recursive source G is said to have constant y displacement if $\Delta y_\pi$ is the same for every complete path $\pi$ in $\tilde{G}$. If the subsource associated with a recursive transition has constant displacement $\Delta y_\pi$, we will define the y displacement of the transition to be $\Delta y_\pi$, by analogy with the displacement of a primitive branch. A recursive source is said to be separable if each node of $G_0$ is tightly constrained in x and if $S_t$ has constant y displacement for every recursive branch t in $G_0$.

If G is separable, the maximization over $\vec{x}_1$ in (18) reduces to the value at $\vec{x}_1 = (\chi_{L_t}, y - \Delta y_t)$ since $L_t$ is tightly constrained in x and $\tilde{S}_t$ has constant y displacement. Moreover, since each $n \in G_0$ is tightly constrained in x(18) further reduces to $$(n; \chi_n, y|G_0) = \max_{\substack{t \in G_0 \text{ s.t.} \\ R_t = n}} \left\{ \begin{array}{c} (L_t; \chi_{L_t}, y - \Delta y_t|G_0) + \\ \log a_t + \\ (n_F(S_t); \chi_n, y| \\ n_t(S_t); \chi_{L_t}, y - \Delta y_t; \tilde{S}_t) \end{array} \right\} \tag{20}$$

where the x and y coordinates are shown explicitly. If the fixed parameters in (20) are dropped as function arguments and we define $$\mathcal{F}(t; y) \equiv \mathcal{L}(n_F(S_t); \chi_{R_t}, y|n_t(S_t); \chi_{L_t}, y - \Delta y_t; \tilde{S}_t) \tag{21}$$

then (20) simplifies further to $$(n; y) = \max_{\substack{t \in G_0 \text{ s.t.} \\ R_t = n}} \left\{ \begin{array}{c} (L_t; y - \Delta y_t) + \\ \log a_t + \\ (t; y) \end{array} \right\} \tag{22}$$

which may be interpreted as a one-dimensional segmental Viterbi recursion in y with segment scores given by F(t;y).

If t is a simple transition, F(t;y) is the match score between the input image and template $Q_t$ at image position $(\chi_{R_t}, y)$. If t is a recursive transition, F(t;y) is computed by finding the best path in $S_t$ from node $n_t(S_t)$ at image position $(\chi_{n_t(S_t)}, y - \Delta y_t)$ to node $n_F(S_t)$ at $(\chi_{n_F(S_t)}, y)$. Since every complete path in $\tilde{S}_t$ has the same y displacement, it follows that the displacement of a path in $\tilde{S}_t$ from $n_t(S_t)$ to any other node n depends only on n. Thus, in computing F(t;y) for a given y, the nodes of $\tilde{S}_t$ may be viewed as tightly constrained in y and the computation reduces to a one-dimensional recursion in x. Consequently, the overall decoding computation for a separable source consists of a set of independent horizontal recursions that compute values of F(t;y) followed by a single vertical recursion that computes (22).

The preceding description and mathematics defining a separable model as used herein may be summarized as follows. A separable model is a 2-d Markov source model that can be expressed as a top-level 1-d vertical model plus a set of horizontal models that correspond to branches of the vertical mode. One aspect of each of the horizontal models is that every complete path through the model starts at a fixed horizontal position and ends at a fixed horizontal position. A second aspect is that the vertical displacement of every complete path in the model is a constant that is independent of the vertical starting position of the path.

1.5 Text Column Example

Figure 5:
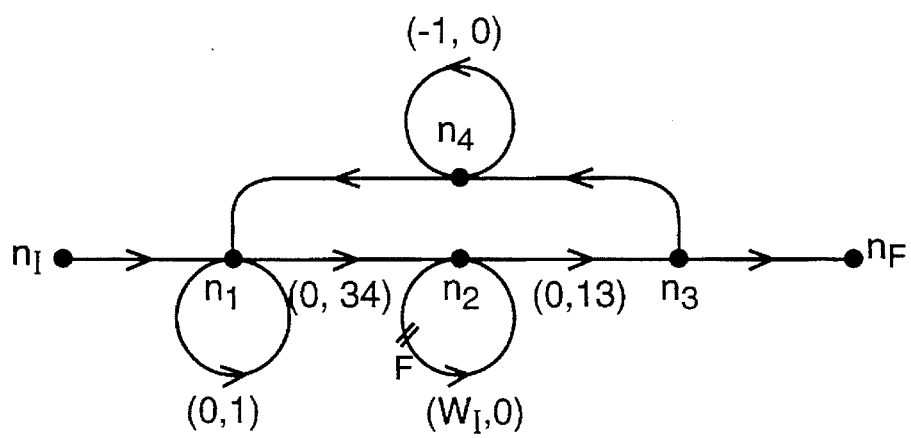
FIG. 5 shows a simple text column source. Transition probabilities, templates and messages are omitted for simplicity.

FIG. 5 shows a simple source model for a column of text in 12 pt Adobe Times Roman, similar to that described in [8]. We will use this example throughout this application to illustrate concepts and algorithms. The operation of the text column source may be explained in terms of an imager automaton which moves over the image plane under control of the source model. In state $n_1$ the imager creates vertical whitespace; each traversal of the self-transition moves the imager down one row. At some point, the imager reaches the top of a text line and enters state $n_2$, which represents the creation of a horizontal text line. The displacement (0,34) of the transition into $n_2$ moves the imager down to the text baseline; 34 is the font height above baseline. The self-transitions at $n_2$ correspond to the individual characters of the font and horizontal whitespace. At the end of a text line the imager moves down by the font depth below baseline, 13, and enters $n_3$. At this point, the imager either exits to the final state or enters "carriage return" state $n_4$ to move back to the left margin in preparation for the next text line.

Table 1 shows a set of node position constraints for the text column source of FIG. 5. The columns labeled $c_n$ contain the user-specified constraints; the remaining columns concern constraint propagation, as discussed later. As this example illustrates, the initial and final states are usually tightly constrained to the upper left and lower right corners of the image plane, respectively. The x constraints on $n_1$ and $n_3$ force each text line (including whitespace before and after the text itself) to span the entire width of the column. For uniformity, all nodes are labeled with constraints; where no explicit constraint is supplied [−∞,+∞] is assumed.

TABLE 1

Initial (user-specified) and propagated constraints for text column source of FIG. 5 (a) Constraints on x. (b) Constraints on y.

| Node | $\bar{C}_n$ | $\bar{C}_n^f$ | $\bar{C}_n^r$ | $C_n$ |
|---|---|---|---|---|
| (a) | | | | |
| $n_I$ | [0, 0] | [−∞, +∞] | [0, 0] | [0, 0] |
| $n_1$ | [0, 0] | [−∞, W] | [−∞, W] | [0, 0] |
| $n_2$ | [−∞, +∞] | [0, +∞] | [−∞, W] | [0, W] |
| $n_3$ | [W, W] | [0, +∞] | [0, +∞] | [W, W] |
| $n_4$ | [−∞, +∞] | [−∞, W] | [0, +∞] | [0, W] |
| $n_F$ | [W, W] | [W, W] | [−∞, +∞] | [W, W] |
| (b) | | | | |
| $n_I$ | [0, 0] | [−∞, +∞] | [−∞, H − 47] | [0, 0] |
| $n_1$ | [−∞, +∞] | [0, +∞] | [−∞, H − 47] | [0, H − 47] |
| $n_2$ | [−∞, +∞] | [34, +∞] | [−∞, H − 13] | [34, H − 13] |
| $n_3$ | [−∞, +∞] | [47, +∞] | [−∞, H] | [47, H] |
| $n_4$ | [−∞, +∞] | [47, +∞] | [−∞, H − 47] | [47, H − 47] |
| $n_F$ | [H, H] | [47, +∞] | [−∞, +∞] | [H, H] |

Figure 6:
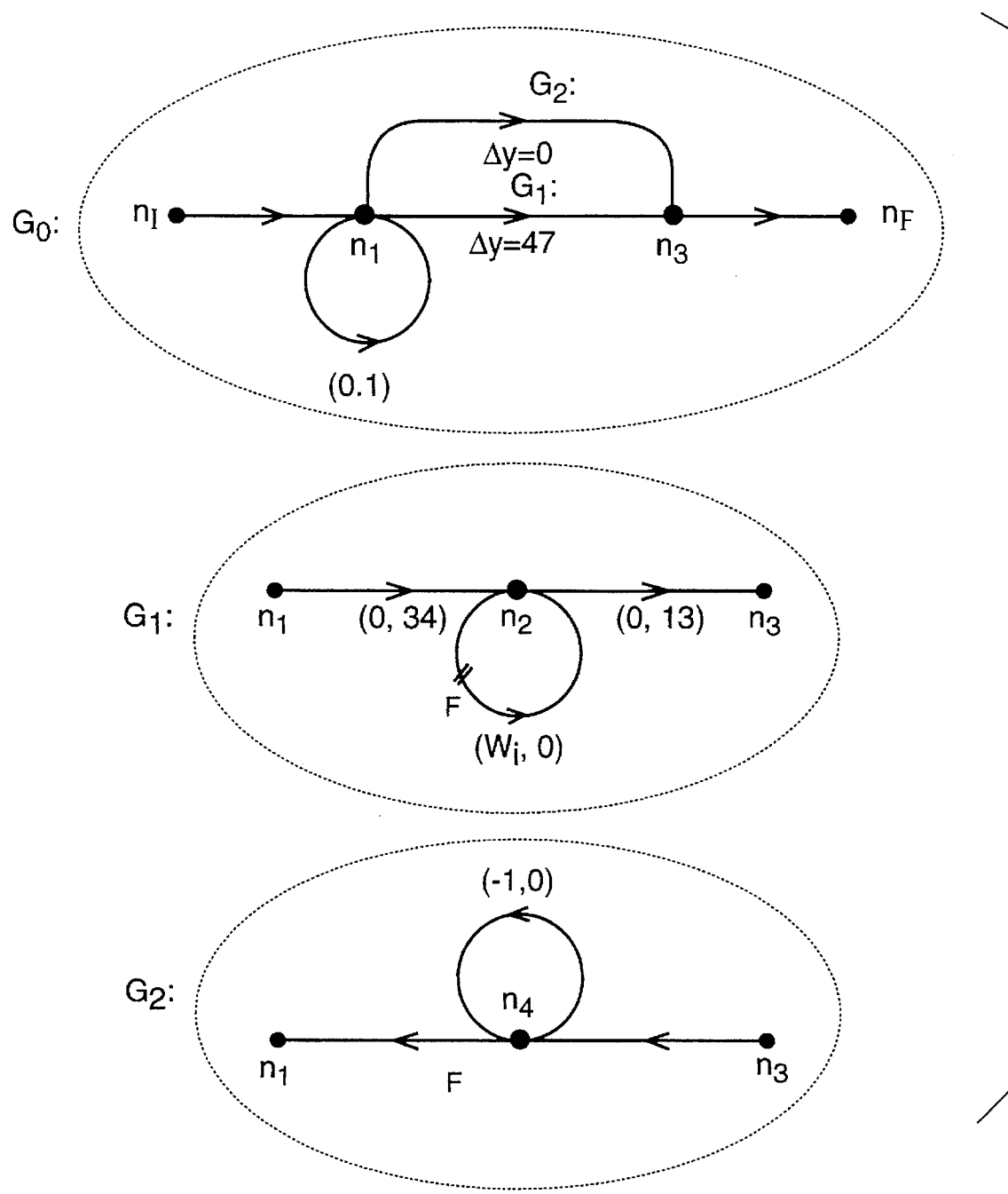
FIG. 6 shows a separable text column source derived from the source in FIG. 5.

FIG. 6 shows a recursive text column source model that is equivalent to the constrained source defined by FIG. 5 and Table 1. This model was constructed automatically using the separation procedure described later in this application. Subsource $G_1$ models the generation of a single line of horizontal text, including the vertical displacements from the top of the line to the baseline and from the baseline to the line bottom. Subsource $G_2$ is the right-to-left carriage return.

Each node of the top-level source $G_0$ is tightly constrained in x, as may be verified from Table 1(a). Furthermore, each complete path through $G_1$ has y displacement 47 and each path through $G_2$ has y displacement 0. Thus the text column source is separable.

2 Iterated Complete Path (ICP) Algorithm

A straightforward approach to decoding with a separable source is to first compute F(t;y) for every t∈$G_0$ and y∈[O,H] and then use (22). Such a procedure effectively corresponds to Viterbi decoding and thus offers no computational savings.

The iterated complete path (ICP) algorithm in accordance with the invention is based on the observation that only the values of F(t;y) for (t;y) on the best path $\hat{\pi}$ are actually relevant to recovering π; the remaining values are computed essentially to verify that $\hat{\pi}$ is indeed the best path. ICP attempts to reduce the overall decoding computation by evaluating F(t;y) as few times as possible for (t;y) not on $\hat{\pi}$.

ICP is based on the following lemma, whose proof is straightforward. Suppose U is a function that upper bounds F, so that $$U(t;y) \geq \mathcal{F}(t;y) \qquad (23)$$

for each t and y. For each path π let U(π) be defined by $$U(\pi) \equiv \sum_{i=1}^{P} [U(t_i; \xi_i) + \log a_{t_i}] \qquad (24)$$

and let F(π) be defined analogously. Note that F(π) is just the path likelihood $\mathcal{L}(\pi)$ given by (10). Suppose that $\hat{\pi}$ is a complete path that maximizes U, so that U($\hat{\pi}$)≥U(π) for every π. Then, if $$U(\hat{\pi}) = \mathcal{F}(\hat{\pi}) \qquad (25)$$

it is simple to show that e also maximizes F, and thus $\mathcal{L}$.

ICP finds a sequence of complete paths that maximize a sequence of U functions. Initially, U is given by an upper bound function H, called a heuristic, that is assumed to be computationally much less expensive to evaluate than F. As ICP proceeds, U is refined by replacing some of the H values by values of F that are computed by actually decoding image rows. ICP terminates when U($\hat{t}_i;\hat{\xi}_i$)=F($\hat{t}_i;\hat{\xi}_i$) for each transition in $\hat{\pi}$.

Figures 7, 8:
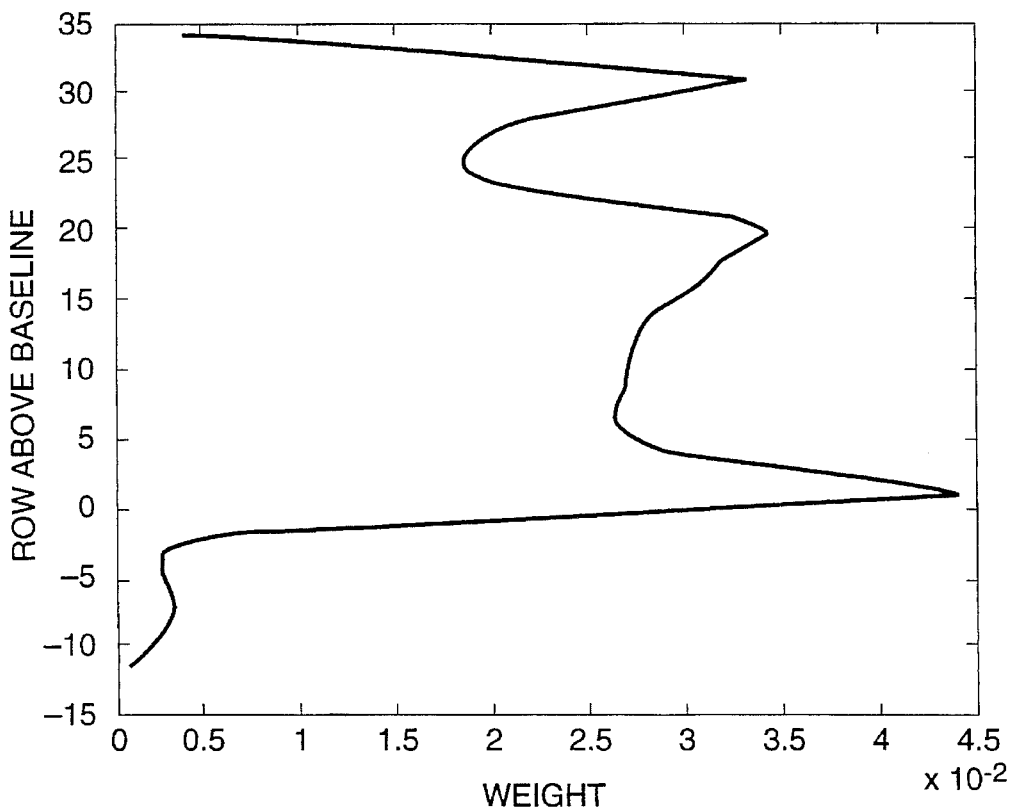
FIG. 7 shows one form of the basic iterated complete path (ICP) algorithm of the invention.
FIG. 8 shows a projection weight function $h_i$ for 12 pt Times Roman.

The basic ICP procedure is shown in FIG. 7. The inputs to ICP are the top-level subsource $G_0$ of a separable Markov source, a procedure that can be invoked to compute F(t;y) for any t and y, and a procedure that computes H(t;y). The ICP procedure maintains two internal data arrays indexed by (t;y). The elements of array U are initialized with the values of H before the iteration begins. As noted above, some of the elements of U are updated with actual values of F during the course of the iteration. Each element of array A is a boolean flag that indicates whether the corresponding element of U is an upperbound (H) or actual (F) score; A(t;y)=true if U(t;y)=F(t;y).

During each pass of the iteration, (22) is computed by dynamic programming using U in place of F and the best path $\hat{\pi}$ is determined. For each transition $\hat{t}_i \in \hat{\pi}$, if array element U($\hat{t}_i;\hat{\xi}_i$) is an upperbound score it is replaced by F($\hat{t}_i;\hat{\xi}_i$) and A($\hat{t}_i;\hat{\xi}_i$) is updated. The iteration continues until U($\hat{t}_i;\hat{\xi}_i$) is an actual score for each $\hat{t}_i \in \hat{\pi}$. The previous lemma guarantees that the final $\hat{\pi}$ is equivalent to the result of a full Viterbi decoding.

The basic ICP algorithm may be extended by allowing updated values of U($\hat{t}_i;\hat{\xi}_i$) to propagate refined upper bounds to nearby array elements; an example will be given in the next section.

3 ICP Heuristic Functions

A heuristic function in ICP is an upper bound H(t;y) to the actual score $$\mathcal{F}(t; y) \equiv \mathcal{L}(n_F; \chi n_F, y \mid n_I; \chi n_I, y - \Delta y_t; \bar{S}_t) \qquad (26)$$

for each recursive transition t, where $n_I$ and $n_F$ are the initial and final nodes of $S_t$. This section develops two types of heuristic functions. The weighted projection heuristic is an upper bound on F(t;y) in terms of the horizontal projection profile $\vec{z}$, where $z_i$ is the number of 1's in row i of observed image Z. The adjacent row heuristic is an upper bound on F(t;y) in terms of F(t;y−1) or F(t;y+1). It can be used at the end of each pass in ICP to update entries in U that are adjacent to newly-computed values of F($\hat{t}_i;\hat{\xi}_i$).

In general, the form of a heuristic function depends on the channel model. This section assumes an asymmetric bit flip channel, in which each pixel of the ideal image Q is independently perturbed during the formation of the observed image Z. The probability of a foreground (black, 1) pixel in Q surviving as a 1 in Z is $\alpha_1$. Similarly, the probability of a 0 being observed as a 0 is $\alpha_0$. The noise parameters are assumed to be constant over the image. With these assumptions we can show that $$\mathcal{L}(Z|Q) = \|Q\| \cdot \log \frac{1-\alpha_1}{\alpha_0} + \|Q \wedge Z\| \cdot \log \frac{\alpha_0 \alpha_1}{(1-\alpha_0)(1-\alpha_1)} \qquad (27)$$

where $\|Q\|$ denotes the number of 1's in Q and $Q \wedge Z$ is the bitwise AND of Q and Z[8]. Normally, $\alpha_0 \geq 0.5$ and $\alpha_1 \geq 0.5$, as we will assume here.

Since each pixel of Q is independently perturbed by the channel, it follows that $\|Q \wedge Z\|$ for a fixed Q is a binomially distributed random variable with mean $\alpha_1\|Q\|$ and variance $\alpha_1(1-\alpha_1)\|Q\|$. The heuristics in this section are based on approximating this distribution with a normal distribution.

3.1 Weighted Projection Heuristic

The weighted projection heuristic is a rigorous probabilistic formulation of a common ad hoc approach to detecting text lines. Since $Pr\{\pi\} \leq 1$ and $\|Q \wedge Z\| \leq \|Q\|$ it follows from (10) and (27) that $$\mathcal{F}(t; y) \leq \mathcal{L}(Z|Q_{\hat{\pi}}) \tag{28}$$

$$\leq \|Q\| \cdot \log \frac{\alpha_1}{1-\alpha_0}$$

where $\hat{\pi}$ is the best complete path in $\tilde{S}_t$ ending at $(\chi_{n_F(s_t)}, y)$ and $Q_{\hat{\pi}}$ is written as $Q$ for simplicity. The weighted projection heuristic uses the right-hand side of (28) as $H(t;y)$ with a maximum likelihood (ML) estimate of $\|Q\|$ that is computed from the horizontal projection profile of the observed image.

If $\vec{q}$ denotes the horizontal projection profile of the underlying template Q, then $$\|Q\| = \sum_{i=0}^{H-1} q_i \tag{29}$$

and $W - q_i$ is the number of 0's in row $i$ of Q. The weighted projection heuristic is based on the assumption that the projection profile $\vec{q}$ has the same shape for every Q from a given source, so that $$q_i = h_i \|Q\| \tag{30}$$

where $\vec{h}$ is a source-dependent vector of non-negative constants that sum to one. For simple text line sources, the profile $\vec{h}$ may be computed as a linear combination of the profiles of the individual character templates, weighted by the relative character frequencies.

Since each template pixel is independently perturbed by the channel it follows that the components of $\vec{z}$, given Q, are independent and binomially distributed, with means $$\mu_i = (\alpha_1 + \alpha_0 - 1) h_i \|Q\| + (1-\alpha_0) W \tag{31}$$

and variances $$\sigma_i^2 = (\alpha_1 + \alpha_0 - 1)(\alpha_0 - \alpha_1) h_i \|Q\| + \alpha_0(1-\alpha_0) W \tag{32}$$

If the binomial distributions are approximated as normal then $$Pr\{\vec{z} | \|Q\|\} \propto \prod_i \frac{1}{\sigma_i (2\pi)^{\frac{1}{2}}} e^{-\frac{(z_i - \mu_i)^2}{2\sigma_i^2}} \tag{33}$$

The ML estimate of $\|Q\|$, denoted $\|\hat{Q}\|$, is found by taking the logarithm of (33), differentiating with respect to $\|Q\|$ and equating to zero. If it is assumed that the channel is approximately symmetric, so that $\alpha_0 \approx \alpha_1$, then the resulting estimate simplifies to $$\|\hat{Q}\| = \frac{\Sigma_i h_i z_i - (1-\alpha_0) W}{(\alpha_1 + \alpha_0 - 1) \Sigma_i h_i^2} \tag{34}$$

The second term of the numerator is a constant positive bias term. Furthermore, the denominator is positive, since $\alpha_0$ and $\alpha_1$ both exceed 0.5 by assumption. Since we are interested in an upper bound, (34) may thus be further simplified by omitting the second term of the numerator, resulting in an estimate that is a linear combination of row projections $z_i$. The weighted projection heuristic follows from substituting this linear estimate into (28) to give $$H_{wp}(t; y) = \kappa_{wp} \sum_i h_i z_i \tag{35}$$

where $$\kappa_{wp} \equiv \frac{\log \frac{\alpha_1}{1-\alpha_0}}{(\alpha_1 + \alpha_0 - 1) \Sigma_i h_i^2} \tag{36}$$

is a constant.

FIG. 23 is pseudo code showing how the weighted projection heuristic can be calculated.

Although (36) defines $\kappa_{wp}$ as a function of the channel parameters, alternative procedures could also be used to determine an appropriate value, such as manual optimization, or training from sample data.

3.2 Adjacent Row Heuristic

The adjacent row heuristic formalizes the observation that $F(t;y)$ normally does not change much from one row to the next. Thus, values of F computed during an ICP pass can be used to infer upper bounds on adjacent values that may be tighter than the initial bounds in U.

The adjacent row heuristic assumes that the best path through $\tilde{S}_t$ ending at $y-1$ is the same as the best path ending at y, i.e., $$\hat{\pi}(y-1) = \hat{\pi}(y) \tag{37}$$

Thus, $Pr\{\hat{\pi}(y)\} = Pr\{\hat{\pi}(y-1)\}$ and $$Q_{\hat{\pi}(y-1)} = Q_{\hat{\pi}(y)}[0,-1)] \tag{38}$$

which corresponds to a simple vertical shift of the composite template $Q_{\hat{\pi}}(y)$. If we define $$\Delta \mathcal{F} \equiv \mathcal{F}(t;y) - \mathcal{F}(t;y-1) \tag{39}$$

we have $$\Delta = (Z|Q_{\hat{\pi}(y)}) - (Z|Q_{\hat{\pi}(y)}[(0,-1)]) \tag{40}$$

which can be combined with (27) and simplified to give $$\Delta \mathcal{F} = \kappa_1 [\|Q^{10} \wedge Z\| - \|Q^{01} \wedge Z\|] \tag{41}$$

where $$\kappa_1 \equiv \log \frac{\alpha_0 \alpha_1}{(1-\alpha_0)(1-\alpha_1)} \tag{42}$$

and $$Q^{10} \equiv \left\{ \begin{array}{c} (x,y) | q(x,y) = 1 \\ q(x, y+1) = 0 \end{array} \right\} \tag{43}$$

is the set of foreground pixels on the lower boundary of Q and $$Q^{01} \equiv \left\{ \begin{array}{c} (x,y) | q(x,y) = 0 \\ q(x, y+1) = 1 \end{array} \right\} \tag{44}$$

is the set of background pixels on the upper boundary of Q. Since each element of $Q^{01}$ corresponds to a $0 \rightarrow 1$ transition in the direction of increasing y and each element of $Q^{10}$ corresponds to a $1 \rightarrow 0$ transition, it follows that $\|Q^{01}\| = \|Q^{10}\|$. We assume that the image source is ergodic so that $$\|Q^{10}\| = p_{10} \|Q\| \quad (45)$$

where $$p_{10} \equiv \Pr\{q(x,y+1) = 0 | q(x,y) = 1\} \quad (46)$$

$$= 1 - p_{11} \quad (47)$$

is a property of the source, independent of Q.

Now, $\|Q^{10} \wedge Z\|$ and $\|Q^{01} \wedge Z\|$ are statistically independent and binomially distributed, with means $\alpha_1 p_{10} \|Q\|$ and $(1-\alpha_0) p_{10} \|Q\|$, respectively, and variances $\alpha_1(1-\alpha_1) p_{10} \|Q\|$ and $\alpha_0(1-\alpha_0) p_{10} \|Q\|$. Thus, the mean of $\Delta F$ is $$\mu_{\Delta pullout;zu644400\_005} = \kappa_1 p_{10} \|Q\| (\alpha_1 + \alpha_0 - 1) \quad (48)$$

and the variance is $$\sigma_{\Delta pullout;zu644400\_005}^2 = \kappa_1^2 p_{10} \|Q\| [\alpha_1(1-\alpha_1) + \alpha_0(1-\alpha_0)] \quad (49)$$

Using the normal approximation, $\delta_1$ may be chosen to guarantee that $$\Delta \mathcal{F} \leq \mu_{\Delta pullout;zu644400\_005} + \delta_1 \sigma_{\Delta pullout;zu644400\_005} \quad (50)$$

with high probability. For example, if $\delta_1 = 3$ the probability of (50) is 0.9987. After combining with (48) and (49) and rearranging, (50) becomes $$\Delta \mathcal{F} \leq \kappa_1 p_{10} \|Q\| (\alpha_1 + \alpha_0 - 1)(1 + \epsilon_1) \quad (51)$$

where $$\epsilon_1 \equiv \delta_1 \sqrt{\frac{\alpha_1(1-\alpha_1) + \alpha_0(1-\alpha_0)}{p_{10} \|Q\| (\alpha_1 + \alpha_0 - 1)^2}} \quad (52)$$

For sufficiently large $\|Q\|$, $\epsilon_1$ may be replaced by a constant upper bound or dropped entirely.

We next find an upper bound for $\|Q\|$ in terms of $F(t,y)$, using (27). Since $\|Q \wedge Z\|$ has mean $\alpha_1 \|Q\|$ and variance $\alpha_1(1-\alpha_1) \|Q\|$, the normal approximation can be used to lower bound $\mathcal{L}(Z|Q)$ by $$\mathcal{L}(Z|Q) \geq \|Q\| \log \frac{1-\alpha_1}{\alpha_0} + \kappa_1 \alpha_1 \|Q\| (1 - \epsilon_2) \quad (53)$$

where $$\epsilon_2 \equiv \delta_2 \sqrt{\frac{1-\alpha_1}{\alpha_1 \|Q\|}} \quad (54)$$

and $\delta_2$ is chosen appropriately. As before, $\epsilon_2$ may be replaced by a constant upper bound for large $\|Q\|$. If the contribution of $\log \Pr\{\hat{\pi}\}$ to $F(t;y)$ is neglected, we have $$\mathcal{F}(t;y) \approx \mathcal{L}(Z|Q) \quad (55)$$

which can be combined with (53) to give $$\|Q\| \leq \frac{\mathcal{F}(t;y)}{\kappa_2} \quad (56)$$

where $$\kappa_2 \equiv \log \frac{1-\alpha_1}{\alpha_0} + \kappa_1 \alpha_1(1 - \epsilon_2) \quad (57)$$

Finally, (51) and (56) can be combined and rearranged to give $$\mathcal{F}(t;y) \leq \kappa_{ar} \mathcal{F}(t;y-1) \quad (58)$$

where $$\kappa_{ar} \equiv \frac{\kappa_2}{\kappa_2 - \kappa_1 p_{10}(\alpha_1 + \alpha_0 - 1)(1 + \epsilon_1)} \quad (59)$$

If $\epsilon_1$ and $\epsilon_2$ are dropped, this further simplifies to $$\kappa_{ar} = \frac{\log \frac{1-\alpha_1}{\alpha_0} + \kappa_1 \alpha_1}{\log \frac{1-\alpha_1}{\alpha_0} + \kappa_1 [\alpha_1 - p_{10}(\alpha_1 + \alpha_0 - 1)]} \quad (60)$$

and the adjacent row heuristic becomes $$H_{ar}(t;y) = \kappa_{ar} \mathcal{F}(t;y-1) \quad (61)$$

FIG. 24 is psuedo code showing how the adjacent row heuristic can be calculated.

Although (61) bounds $F(t;y)$ in terms of $F(t;y-1)$, it is clear that similar bounds can be derived in terms of $F(t;y\pm 1)$, for other values of i. Also, as before, procedures such as manual optimization and training from data could be used as alternatives to (59) in setting $\kappa_{ar}$.

3.3 Text Column Example

FIG. 8 shows the projection weight function $h_i$ for the horizontal text line subsource $G_1$ shown in FIG. 6. The function was computed by superimposing the individual character projection functions for the subset of the 12 pt Adobe Times Roman font consisting of the uppercase and lowercase letters, the digits and 8 punctuation symbols. The superimposed projections were weighted by their relative frequency of occurrence in a corpus of random text.

FIG. 9 shows an image containing 10 lines of random Times Roman text. The corresponding values of the weighted projection heuristic $H_{wp}$ and the actual score F for subsource $G_1$ are shown in FIG. 10 as functions of the image row y coordinate.

4. Converting Recursive Sources to Separable Form

ICP requires that the image source model be separable. In some situations, the model created by a user will be separable and ICP can be directly applied. Often, however, the natural structure of a class of images leads to a model that is recursive, but not separable. Note that separability is an attribute of the form of a model and is not an inherent property of the image source. Thus, it is possible that a given non-separable recursive source may be equivalent to some separable source and, furthermore, that transformation into separable form might be performed algorithmically. This section describes a simple procedure in accordance with the invention for transforming recursive sources into separable form. Any separable form created by the algorithm is guaranteed to be equivalent to the original model.

The first step of the procedure is straightforward and consists of flattening the input recursive source G into the equivalent constrained source $\tilde{G}$, as described previously. The algorithm then attempts to construct a separable source that is equivalent to $\tilde{G}$. A key factor determining separability of a constrained source is the number of nodes that are tightly constrained in x. Typically, position constraints are supplied by the user for only a small subset of the nodes. The second step of the conversion procedure, which is optional, propagates the user-specified constraints to the other nodes of the model. The final step of the procedure is the actual separation of the constrained source.

We will describe separation first and then discuss constraint propagation.

4.1 Converting Constrained Sources to Separable Form

Figure 11:
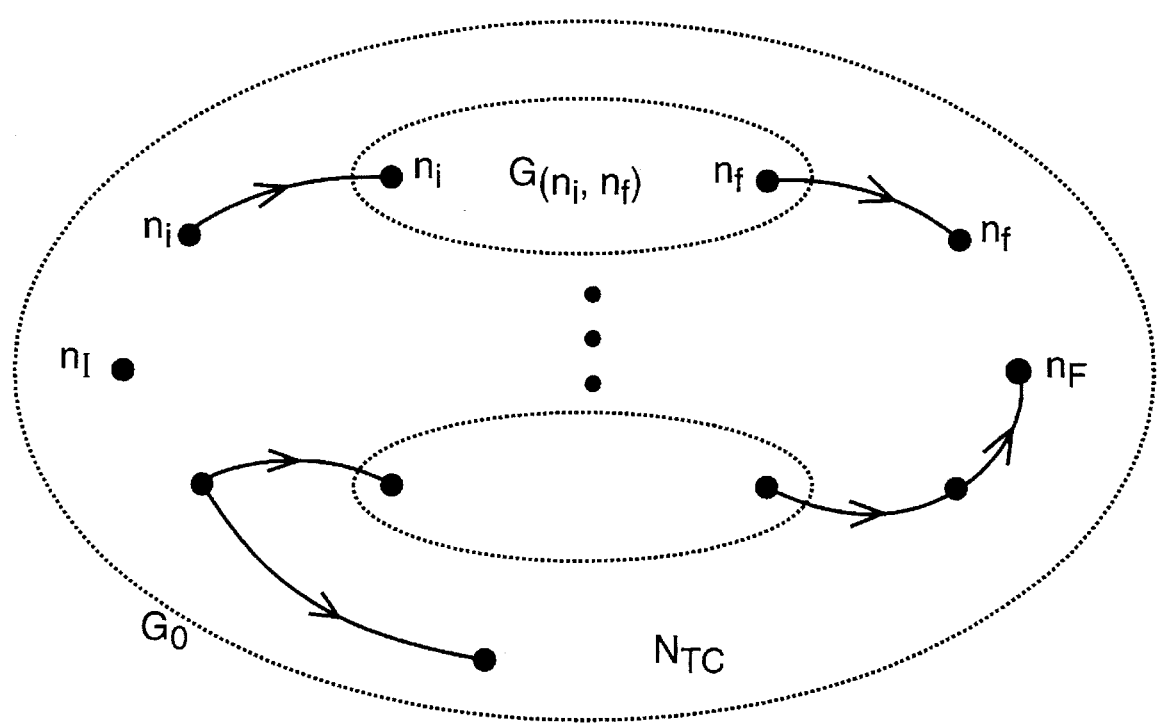
FIG. 11 shows one form of conversion of constrained source to separable form in accordance with this invention.

FIG. 11 summarizes the structure of the separable source produced by the algorithm. Let $\tilde{G}$ be a constrained Markov source and let be $N_{TC}$ the set of nodes that are tightly constrained in x. The nodes in $N_{TC}$ become the nodes of the top-level subsource $G_0$. The start and final nodes of $G_0$ are taken to be those of $\tilde{G}$; these nodes are typically in $N_{TC}$, as noted previously. The transitions of $\tilde{G}$ that connect nodes in $N_{TC}$ become primitive transitions in $G_0$.

For each pair of nodes $(n_i, n_f) \in N_{TC} \times N_{TC}$, let $\tilde{G}(n_i; n_f)$ denote the subgraph of $\tilde{G}$ formed by removing all nodes of $N_{TC}$ except $n_i$ and $n_f$, all branches connected to the deleted nodes, all branches that enter $n_i$, all branches that exit $n_f$ and all branches from $n_i$ to $n_f$. If there is a path in $\tilde{G}(n_i; n_f)$ from $n_i$ to $n_f$ then $G_0$ includes a recursive transition from $n_i$ to $n_f$, where the subsource $G_{(n_i;n_f)}$ associated with that transition is the subgraph of $\tilde{G}(n_i;n_f)$ connected to both $n_i$ and $n_f$. The start and final nodes of $G_{(n_i;n_f)}$ are copies of $n_i$ and $n_f$. Informally, $G_{(n_i;n_f)}$ represents the paths in $\tilde{G}$ from $n_i$ to $n_f$ that do not enter a tightly constrained node before terminating at $n_f$.

If each $G_{(n_i;n_f)}$ has constant y displacement then $G_0$ plus the set of $G_{(n_i;n_f)}$ subsources forms a separable source. Otherwise, the result is a recursive source that is not separable.

The above construction generates a separable source in which only $G_0$ contains recursive transitions and where each subsource is invoked by a single recursive transition. The model may be simplified by partitioning the $G_{(n_i;n_f)}$ into sets of equivalent subsources and retaining only one member from each equivalence class. We have found that Viterbi decoding using this simplified separable source is often significantly faster than using the original constrained source. Thus, flattening followed by separation may be advantageous even when ICP is not used.

4.2 Propagation of Node Position Constraints

The primary objective of constraint propagation is to derive from the user-supplied constraints a set of implied constraints for the remaining nodes of the model. As will be seen, a secondary outcome is that some of the user-supplied constraints are tightened as a result of constraint propagation from other nodes. Thus, for uniformity, we may assume that every node has a user-specified constraint and the objective is simply to tighten them; if no constraint is explicitly provided $\mathcal{C}_n = [-\infty, +\infty]$ is assumed. The position constraints for x and y are propagated separately. For simplicity, notation introduced previously for vector quantities will be used in this section to refer to scalar coordinates and constraints. For example, $\mathcal{C}_n$ will denote a constraint interval (rather than a rectangle), $\xi$ will denote a scalar path position (rather than a vector), branch displacements will be scalars, etc.

Figure 12:
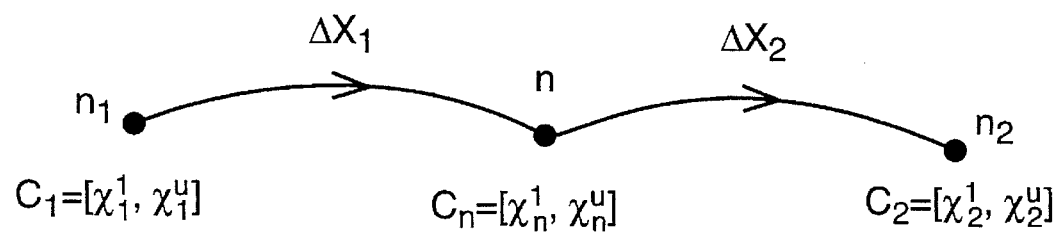
FIG. 12 shows a simple constraint propagation example.

FIG. 12 shows a simple example that illustrates the basic principles of constraint propagation. Suppose that nodes $n_1$, n, and $n_2$ have user-supplied constraints $\mathcal{C}_1$, $\mathcal{C}_n$ and $\mathcal{C}_2$, respectively, and consider the implications of these constraints for the possible values of the path position $\xi$ at node n. In the first place, the explicit constraint at n means that $$\chi_n^l \leq \xi \leq \chi_n^u \tag{62}$$

must hold for every allowed path. However, because a path entering n must have just exited $n_1$, $\xi$ will also satisfy the condition $$\chi_1^l + \Delta x_1 \leq \xi \leq \chi_1^u + \Delta x_1 \tag{63}$$

as a result of the constraint at $n_1$. Similarly, because all paths leaving n immediately enter $n_2$, $$\chi_2^l - \Delta x_2 \leq \xi \leq \chi_2^u - \Delta x_2 \tag{64}$$

will also hold. Thus, it is sufficient to allow only values of $\xi$ in the interval $\hat{\mathcal{C}}_n = [\hat{\chi}_n^l, \hat{\chi}_n^u]$ defined by $$\hat{\chi}_n^l = \max(\chi_1^l + \Delta x_1, \chi_2^l - \Delta x_2, \chi_n^l) \tag{65}$$

$$\hat{\chi}_n^u = \min(\chi_1^u + \Delta x_1, \chi_2^u - \Delta x_2, \chi_n^u) \tag{66}$$

or, in set notation, $$\hat{\mathcal{C}}_n = \mathcal{C}_n^f \cap \mathcal{C}_n^r \cap \mathcal{C}_n \tag{67}$$

where $$\mathcal{C}_n^f = \mathcal{C}_1 \oplus \Delta x_1 \tag{68}$$

is called the forward propagated constraint, $$\mathcal{C}_n^r = \mathcal{C}_2 \ominus \Delta x_2 \tag{69}$$

is the reverse constraint, and $\oplus$ and $\ominus$ are operators that translate an interval by a specified scalar displacement. Constraint $\mathcal{C}_n$ may be further tightened by noting that $\mathcal{C}_1$ and $\mathcal{C}_2$ in (68) and (69) may be replaced by $\hat{\mathcal{C}}_1$ and $\hat{\mathcal{C}}_2$. Finally, for nodes with multiple incoming or outgoing branches, (68) and (69) generalize to $$\hat{C}_n^f = \bigcup_{t | R_t = n} \hat{C}_{L_t} \oplus \Delta x_t \tag{70}$$

and $$\hat{C}_n^r = \bigcup_{t | L_t = n} \hat{C}_{R_t} \ominus \Delta x_t \tag{71}$$

respectively.

Position constraint propagation involves solving the set of equations (67), (70) and (71) for each $\mathcal{C}_n$, subject to the boundary condition that the solutions for the start and final nodes include specified intervals. Typical boundary conditions are $\mathcal{C}_{nI} = [0,0]$ and $\mathcal{C}_{\omega F} = [W,W]$, where W is the image width.

Solving the constraint equations is complicated because the forward and reverse constraints are coupled by (67) and cycles in the source lead to recursive dependencies. One approach to reducing the difficulty is to relax the requirement that the computed constraints be as tight as possible. As long as the user-specified constraints are satisfied, the only consequence will be that the decoding trellis will be larger than necessary and/or not enough tightly constrained nodes will be identified to separate the source. Thus, we look for modifications to the constraint equations whose effect is to enlarge the solution intervals. Specifically, we will make substitutions for $\mathcal{C}_{L_t}$ and $\mathcal{C}_{R_t}$ in the right sides of (70) and (71).

From (67) we have the following relations $$\hat{\mathcal{C}}_n \subseteq \mathcal{C}_n^f \tag{72}$$

$$\hat{\mathcal{C}}_n \subseteq \mathcal{C}_n \tag{73}$$

$$\hat{\mathcal{C}}_n \subseteq \mathcal{C}_n^r \tag{74}$$

We modify (70) by replacing $\hat{C}_{L_i}$ with $\hat{C}_{L_i}^f$ defined by $$\hat{C}_{L_i}^f \equiv \begin{cases} C_n & \text{if } C_n \text{ is a finite interval} \\ \hat{C}_n^f & \text{otherwise} \end{cases} \quad (75)$$

to give $$\hat{C}_n^f = \bigcup_{i|R_i=n} \hat{C}_{L_i}^{f'} \oplus \Delta x_i \quad (76)$$

Similarly, (71) becomes $$\hat{C}_n^r = \bigcup_{i|L_i=n} \hat{C}_{R_i}^{r'} \ominus \Delta x_i \quad (77)$$

where $\hat{C}_n^{r'}$ is defined analogously. The primary effect of these substitutions is that the forward and reverse constraints become decoupled and can be propagated independently. We will discuss the propagation of forward constraints. Propagation of reverse constraints is similar and reduces to propagating forward constraints in the transpose of G, constructed by reversing the direction of each transition and replacing each branch displacement with its negative.

Figure 13:
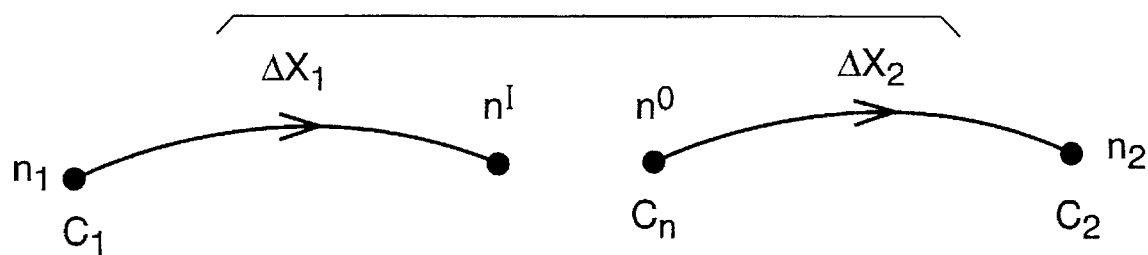
FIG. 13 shows the result of splitting node n of FIG. 12 for forward constraint propagation.

If $\hat{C}_n$ is finite (i.e. the user actually specified a constraint for node n) then $\hat{C}_n^f$ does not occur on the right hand side of (76). As a result forward constraint propagation in G is equivalent to propagation in the modified source G' derived by splitting each finitely-constrained node n into two nodes $n^i$ and $n^o$, where $n^i$ inherits the incoming branches of n and $n^o$ inherits the outgoing branches as well as constraint $\hat{C}_n$. As an example, the splitting of node n in FIG. 12 is illustrated in FIG. 13.

Figure 14:
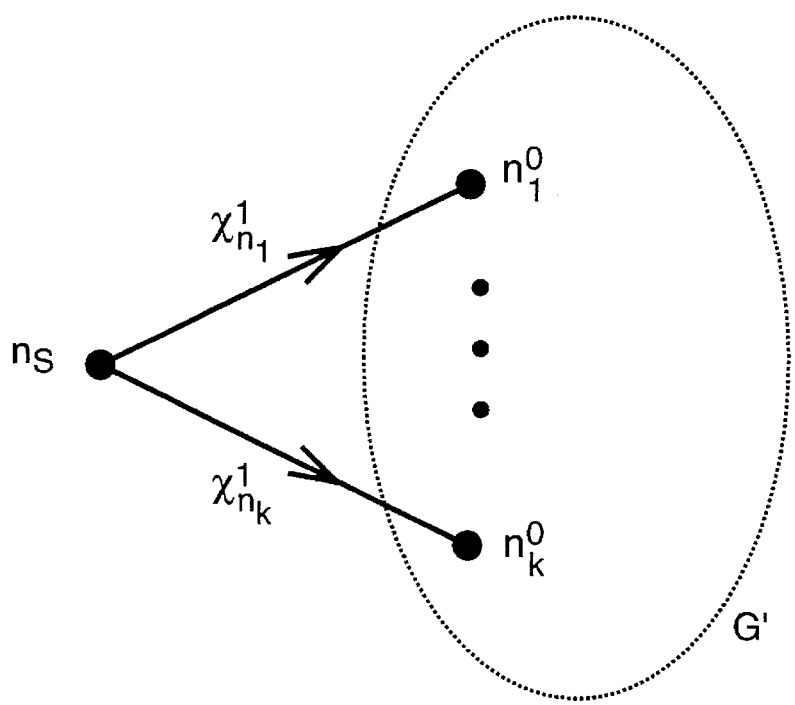
FIG. 14 shows a graph for propagation lower limits of forward constraints. Constraints are propagated by finding paths of minimum displacement from $n_s$.

The advantage of splitting the constrained nodes is that forward constraint propagation in G' is equivalent to finding paths of minimum and maximum displacement in graphs that are simple derivatives of G'. The upper and lower limits of $\hat{C}_n = [\hat{\chi}_n^{fl}, \hat{\chi}_n^{fu}]$ are found separately. The lower limits $\hat{\chi}_n^{fl}$ are computed using the graph in FIG. 14 in which the user-specified lower limits $\chi_n^l$ become displacements on the branches leaving $n_s$. The lower limits are propagated by finding the minimum path displacement from $n_s$ to each node of G'. If node n was split, $\hat{\chi}_n^{fl}$ is the minimum displacement to $n_i$; otherwise $\hat{\chi}_n^{fl}$ is the minimum displacement to n. The upper limits $\hat{\chi}_n^{fu}$ are found similarly, by finding maximum path displacements when the displacements of the branches leaving $n_s$ are the upper limits $\chi_n^{fu}$.

Finding paths of minimum or maximum displacement from a single graph node is a standard graph problem[1]. A minor issue arises in the present situation because G' may contain cycles of non-zero total displacement, with the result that one or both of the propagated constraint limits may be infinite for some nodes. Path-finding algorithms that detect such cycles are also well-known [1].

FIG. 25 is pseudo code chart showing operations of the constrained source separation procedure.

4.3 Text Column Example

Table 1 shows the values of $\hat{C}_n^f, \hat{C}_n^r$ and $\hat{C}_n$ for each node of the text column source of FIG. 5, computed using the constraint propagation algorithm.

As noted previously, FIG. 6 shows the result of applying the separation algorithm to the constrained text column source.

5. Experimental Results

Table 2 summarizes the results of a simple experiment comparing the times to decode a text page using the Viterbi algorithm and two variations of ICP. The sample page was about 7 in×10.5 in and contained random text, similar to FIG. 9, organized as 45 lines of 70 characters each. The page was scanned at 300 dpi; the dimensions of the binary image were W=2134 and H=3176. The page image was decoded using the Times Roman text column models from FIG. 5 (for Viterbi decoding) and FIG. 6 (for ICP). Results are shown for ICP with the weighted projection heuristic $H_{wp}$ and with the combination of $H_{wp}$ and the adjacent row heuristic $H_{ar}$. The observed ICP speedups (relative to Viterbi) were about 11 for $H_{wp}$ and about 19 for the combination.

TABLE 2

Time to decode a sample text page using the Viterbi algorithm and two variations of ICP.

| Algorithm | Heuristics | Iterations | Rows Decoded | Time (secs.) | Speedup |
|---|---|---|---|---|---|
| Viterbi | — | — | 3176 | 2557 | 1.0 |
| ICP | $H_{wp}$ | 47 | 275 | 231 | 11.0 |
| ICP | $H_{wp}, H_{ar}$ | 23 | 157 | 133 | 19.2 |

It is evident from Table 2 that ICP with one heuristic offers a large speedup in decode time, whereas ICP with both heuristics offers even a greater speedup.

It will also be helpful to the reader to show exactly how the decoder of the invention would operate in comparison with the Viterbi algorithm alone. This comparison uses a simple example in which a separable source similar to that in FIG. 6 is used to decode a small noise-free image containing a single line of text, such as the first line in the image of FIG. 9. Because the image contains a single text line, it is clear that the best path through the source of FIG. 6 will traverse the recursive branch labeled $G_1$ exactly once. Thus, decoding the image reduces to identifying the image row at which this traversal takes place. This, in turn, involves finding the value of y that maximizes F(t;y) for the $G_1$ transition. Table 3 lists hypothetical values of the weighted projection heuristic $H_{wp}(t;y)$ and the actual score F(t;y) as a function of row index y. The image is assumed to have height H=10. It is clear from the table that the maximum value of F(t;y) is 1000 and occurs at y=5. A straightforward Viterbi decoder would find this value by simply computing all 10 values of F and picking the largest. The objective of the heuristic search is to minimize the number of F(t;y) values that are actually computed as the maximum value is sought.

TABLE 3

Example weighted row projection heuristic scores $H_{wp}$ and actual scores F.

| y | $H_{wp}$ (t; y) | F (t; y) |
|---|---|---|
| 1 | 800 | 200 |
| 2 | 1000 | 400 |
| 3 | 1100 | 600 |
| 4 | 900 | 800 |
| 5 | 1100 | 1000 |
| 6 | 1300 | 900 |
| 7 | 1500 | 700 |
| 8 | 1200 | 500 |
| 9 | 900 | 300 |
| 10 | 600 | 100 |

Operation of the ICP algorithm using the weighted projection heuristic is summarized in Table 4. Each column of the table under "iteration" represents the state of the score array U(t;y) at the start of the indicated iteration. Initially the elements of U are set to the values of the heuristic scores $H_{wp}(t;y)$. As the algorithm proceeds, some of the entries are replaced by actual scores F(t;y); these entries are marked with asterisks '*' in the table.

TABLE 4

Evolution of U (t; y) during ICP with weighted row projection heuristic. Asterisk denotes actual score.

| y | Iteration | | | | | | |
|---|---|---|---|---|---|---|---|
| | 0 | 1 | 2 | 3 | 4 | 5 | 6 |
| 1 | 800 | 800 | 800 | 800 | 800 | 800 | 800 |
| 2 | 1000 | 1000 | 1000 | 1000 | 1000 | 1000 | 400* |
| 3 | 1100 | 1100 | 1100 | 1100 | 600* | 600* | 600* |
| 4 | 900 | 900 | 900 | 900 | 900 | 900 | 900 |
| 5 | 1100 | 1100 | 1100 | 1100 | 1100 | 1000* | 1000* |
| 6 | 1300 | 1300 | 900* | 900* | 900* | 900* | 900* |
| 7 | 1500 | 700* | 700* | 700* | 700* | 700* | 700* |
| 8 | 1200 | 1200 | 1200 | 500* | 500* | 500* | 500* |
| 9 | 900 | 900 | 900 | 900 | 900 | 900 | 900 |
| 10 | 600 | 600 | 600 | 600 | 600 | 600 | 600 |

During ICP iteration 0, the largest value of U(t;y) is 1500 and occurs at y=7. Thus, the text is initially hypothesized to occur at row 7. Since the value of 1500 is a heuristic score, rather than an actual score, a full decoding of the image row at y=7 is performed using the source model $G_1$. The resulting value of F(t;7), 700, is tagged as an actual score and stored into the U(t;y) array.

During iteration 1, the largest value of U(t;y) is 1300 and occurs at y=6. Since this is also a heuristic score, F(t;6) is computed and the result, 900, is placed into the table. The process continues until the largest entry in the table corresponds to an actual, rather than heuristic, score. It is simple to step through and verify that the largest values during iterations 2–5 occur at y=8,3,5,2, respectively and are all heuristic scores. (In case of a tie, the row with the lower value of y is arbitrarily selected.) Finally, during iteration 6, the largest value, 1000, occurs at y=5 and is an actual score. The algorithm thus terminates. By counting the asterisks in the final column, it may be seen that 6 values of F(t;y) were computed by the ICP algorithm. This is less than the 10 values computed by the Viterbi decoder.

Table 5 summarizes the progress of ICP when the adjacent row score heuristic is used in addition to the weighted projection heuristic. As before, the initial contents of U(t;y) are the weighted projection scores and the largest value during iteration is 1500 and occurs at y=7. However, after computing F(t;7) and updating U(t;7) to 700, ICP next applies the adjacent row heuristic at y=6 and y=8. In this example, we assume that the heuristic coefficient is $\kappa_{ar}$=1.25. Thus, the adjacent row heuristic score is 875 (1.25× 700). Since this value is less than 1300, the current value of U(t;6), and since U(t;6) is a heuristic score, the value of U(t;6) is decreased to 875. Similarly, U(t;8) is reduced from 1200 to 875. Note that these values are still heuristic scores, so they are not flagged with asterisks.

TABLE 5

Evolution of U (t; y) during ICP with weighted row projection and adjacent row score heuristics ($K_{ar}$ = 1.25). Asterisk denotes actual score.

| y | Iteration | | | |
|---|---|---|---|---|
| | 0 | 1 | 2 | 3 |
| 1 | 800 | 800 | 800 | 800 |
| 2 | 1000 | 1000 | 750 | 750 |
| 3 | 1100 | 1100 | 600* | 600* |
| 4 | 900 | 900 | 750 | 750 |
| 5 | 1100 | 1100 | 1100 | 1000* |
| 6 | 1300 | 875 | 875 | 875 |
| 7 | 1500 | 700* | 700* | 700* |
| 8 | 1200 | 875 | 875 | 875 |
| 9 | 900 | 900 | 900 | 900 |
| 10 | 600 | 600 | 600 | 600 |

During iteration 1, the largest value of U(t;y) is 1100 and occurs at y=3. As before, the actual score F(t;3) is computed and U(t;3) is updated to 600. The adjacent row heuristic score is 750. This value replaces both U(t;2) and U(t;4), since they are heuristic scores that are larger than 750 (1000 and 900, respectively).

During iteration 2, the largest value of U(t;y) is 1100 and occurs at y=5. The value of F(t;5) is computed and U(t;5) is updated to 1000. In this case, the adjacent row heuristic score is 1250, which is larger than the current values of U(t;4) and U(t;6). As a result, these adjacent scores are not modified.

Finally, the largest value of U(t;y) during iteration 3 is 1000 and occurs at y=5. Since this is an actual score the algorithm is finished. Note that only 3 values of F(t;y) were computed, less than both the Viterbi algorithm and ICP with just the weighted projection heuristic.

Although there have been described what are at present considered to be the preferred embodiments of the invention, it will be understood that the invention may be embodied in other specific forms without departing from the essential characteristics thereof. The present embodiments are therefore to be considered in all respects as illustrative, and not restrictive. This scope of the invention is indicated by the appended claims rather than by the foregoing description.

APPENDIX

[1] A. V. Aho, J. E. Hopcroft, J. D. Ullman, *The Design and Analysis of Computer Algorithms*, 1974, Reading: Addison-Wesley pp. 207–209, 221.

[2] F. M. Wahle, K. Y. Wong, R. G. Casey, "Block Segmentation and Text Extraction in Mixed Test/Image Documents", Computer Graphics and Image Processing, 20, 375–390 (1982).

[3] A. Barr and E. Feigenbaum (eds.), *The Handbook of Artificial Intelligence*, 1981, Los Altos, Calif.: William Kaufman, Inc, pp. 58–71; 263–267; 364–388.

[4] C. B. Bose and S. Kuo, "Connected and Degraded Text Recognition using a Hidden Markov Model", 11*th International Conference on Pattern Recognition*, The Hague, Netherlands, Sep., 1992.

[5] F. Chen and L. Wilcox, "Wordspotting in scanned images using hidden Markov models", 1993 *IEEE International Conf. on Acoustics, Speech and Signal Processing*, Minneapolis, Minn., Apr. 27–30, 1993.

[6] P. Chou, "Recognition of equations using a two-dimensional stochastic context-free grammar", SPIE *Conf. on Visual Communications and Image Processing*, Philadelphia, Pa., Nov. 1989.

[7] P. Chou and G. Kopec, "A stochastic attribute grammar model of document production and its use in document recognition." *First Intl. Workshop on Principles of Document Processing*, Washington, DC, Oct. 21–23, 1992.

[8] G. Kopec and P. Chou, "Document image decoding using Markov source models", submitted to *IEEE Trans. Pattern Analysis and Machine Intelligence,* Jan., 1992.

[9] G. Kopec, "Row-Major Scheduling of Image Decoders", report P92-0006 (EDL-92-5), XEROX Palo Alto Research Center, Palo Alto, Calif., June 1992.

[10] G. Kopec, "Least-Squares Font Metric Estimation from Images", submitted to *IEEE Trans. on Image Processing,* July, 1992. Also report P92-00086 (ISTL-92-1), XEROX Palo Alto Research Center, Palo Alto, Calif., July, 1992.

[11] E. Levin and R. Pieraccini, "Dynamic planar warping for optical character recognition", 1992 *IEEE International Conf. on Acoustics, Speech and Signal Processing,* San Francisco, Calif., Mar. 23–26, 1992, vol. III, pp. 149–152.

[12] A. Barr and E. Feigenbaum (eds.), *The Handbook of Artificial Intelligence,* 1981, Los Altos, Calif.: William Kaufman, Inc, pp. 58–71; 263–267; 364–388.

What is claimed is:

1. In a text-like image recognition computer-implemented method for analyzing a bitmap image into a combination of symbol templates selected from a library of templates on the basis of paths determined from traversing a decoding trellis using Markov source models and Viterbi decoding, said decoding trellis comprising a first plurality of regions likely to contain the best path for traversing the decoding trellis, and a second plurality of regions of the decoding trellis not likely to contain the best path for traversing the decoding trellis, said Viterbi decoding comprising a 2-dimensional Viterbi algorithm to compute a set of likelihood functions at each point of the image plane, wherein each point of the image plane is represented in the decoding trellis by nodes and transitions into each node and Viterbi decoding comprises computing the likelihood of the most likely path into each node at each image plane point, the improvement comprising:

(a) using as the Markov source model a separable model, said separable model being a 2-d model that can be expressed as a top-level 1-d vertical model plus a set of horizontal models that correspond to branches of the vertical model in which for each of the horizontal models, every complete path through the horizontal model starts at a fixed horizontal position and ends at a fixed horizontal position, and the vertical displacement of every complete path in the model is a constant that is independent of the vertical starting position of the path;

(b) without full decoding, identifying said first plurality of regions of the decoding trellis likely to contain the best path, (c) performing full Viterbi decoding only in the first plurality of regions determined in step (b) to determine the best path through the decoding trellis, (d) producing an image or text string representing an image based on the combination of symbol templates derived from the best path determined in step (c).

2. The method of claim 1, wherein the Markov source model is first subjected to a transforming process to determine whether it could be converted into separable form, and if it can be converted into separable form the separable form of the source model is used.

3. The method of claim 1, in which the at least one complete path is found using a Viterbi algorithm.

4. The method of claim 1, in which at least one complete path is found using an iterated complete path algorithm comprising the steps of:

i) computing at least one score for a transition of the decoding trellis of the vertical model that corresponds to a horizontal model, ii) finding a best path through the decoding trellis of the vertical model of the separable model using at least one computed score computed in step i, iii) modifying at least one computed score computed in step i for a transition of the decoding trellis of the vertical model that corresponds to a horizontal model using the best path through the decoding trellis of the vertical model of the separable model, iv) repeating step ii using the modified score and step iii until a stopping criterion is met.

5. The method of claim 4 in which, in step iii, modifying at least one score of a transition of the decoding trellis of the vertical model that corresponds to a horizontal model includes finding a best path through a decoding trellis for the horizontal model.

6. The method of claim 4 in which modifying at least one score of step iii involves using a Viterbi algorithm.

7. The method of claim 4 in which at least one score computed in step i is computed using a weighted sum of the counts of black pixels in at least one row of the image.

8. In a text-like image recognition computer-implemented method for analyzing a bitmap image into a combination of symbol templates selected from a library of templates on the basis of at least one complete path computed through a decoding trellis of a Markov source, the improvement comprising:

a) using as the Markov source model a separable model, said separable model being a 2-d model that can be expressed as a top-level 1-d vertical model plus a set of horizontal models that correspond to branches of the vertical model in which for each of the horizontal models, every complete path through the horizontal model starts at a fixed horizontal position and ends at a fixed horizontal position, and the vertical displacement of every complete path in the model is a constant that is independent of the vertical starting position of the path, b) producing an image or text string representing an image based on the combination of symbol templates.

9. The method of claim 8 in which the Markov source is first subjected to a transforming process to convert it into a separable form.

* * * * *